(12) United States Patent
Brahmadesam et al.

(10) Patent No.: US 10,909,143 B1
(45) Date of Patent: Feb. 2, 2021

(54) SHARED PAGES FOR DATABASE COPIES

(71) Applicant: Amazon Technologies, Inc., Seattle, WA (US)

(72) Inventors: Murali Brahmadesam, Woodinville, WA (US); Raman Mittal, Seattle, WA (US); Li-Che Hsiao, Stanford, CA (US); Konstantin Dubinets, Seattle, WA (US); Seungmin Wei, Bellevue, WA (US); Xiaofeng Bao, Fremont, CA (US); Changan Han, Bellevue, WA (US); Saleem Mohideen, Saratoga, CA (US); Venkatesh Nandakumar, Seattle, WA (US); Xiang Peng, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 793 days.

(21) Appl. No.: 15/488,329

(22) Filed: Apr. 14, 2017

(51) Int. Cl.
| | |
|---|---|
| *G06F 16/00* | (2019.01) |
| *G06F 16/27* | (2019.01) |
| *G06F 16/21* | (2019.01) |
| *G06F 16/22* | (2019.01) |
| *G06F 16/23* | (2019.01) |

(52) U.S. Cl.
CPC .......... *G06F 16/273* (2019.01); *G06F 16/219* (2019.01); *G06F 16/2228* (2019.01); *G06F 16/2308* (2019.01); *G06F 16/27* (2019.01)

(58) Field of Classification Search
CPC ...... G06F 16/273; G06F 16/27; G06F 16/219; G06F 16/2308; G06F 16/2228
See application file for complete search history.

(56) References Cited

U.S. PATENT DOCUMENTS

| | | | |
|---|---|---|---|
| 7,334,094 B2 | 2/2008 | Fair | |
| 8,832,028 B2 | 9/2014 | Susairaj et al. | |
| 8,924,357 B2* | 12/2014 | Zane | G06F 16/24532 707/649 |
| 9,251,003 B1* | 2/2016 | Gupta | G06F 11/1469 |
| 9,280,591 B1* | 3/2016 | Kharatishvili | G06F 16/27 |
| 9,424,140 B1* | 8/2016 | Madhavarapu | G06F 11/0751 |
| 9,507,843 B1* | 11/2016 | Madhavarapu | G06F 3/0619 |
| 9,542,456 B1* | 1/2017 | Das | G06F 16/2468 |
| 10,007,445 B2* | 6/2018 | Nithrakashyap | G06F 3/0665 |
| 10,108,496 B2* | 10/2018 | Hoobler, III | G06F 16/273 |
| 10,216,949 B1* | 2/2019 | McKelvie | G06F 21/6227 |

(Continued)

OTHER PUBLICATIONS

U.S. Appl. No. 16/831,651, filed Mar. 26, 2020, Murali Brahmadesam, et al.

*Primary Examiner* — Noosha Arjomandi
(74) *Attorney, Agent, or Firm* — Robert C. Kowert; Kowert, Hood, Munyon, Rankin & Goetzel, P.C.

(57) ABSTRACT

Data pages of a database may be shared to create a copy of the database. A request to create a copy of the database may be received. Pointers to the data pages in the data store may be generated and stored as part of the copy of the database. When a request to read a data page in the copy of the database is received, the pointer to the data page may be accessed and the data page read from the database. When a request to modify a data page in the copy of the database is received, a modified version of the data page may be stored as part of the copy of the database and the pointer updated to point to the modified version of the data page.

20 Claims, 14 Drawing Sheets

(56) References Cited

U.S. PATENT DOCUMENTS

| | | | |
|---|---|---|---|
| 2005/0165858 A1* | 7/2005 | Tom | G06F 16/27 |
| 2010/0198920 A1* | 8/2010 | Wong | G06F 9/546 |
| | | | 709/206 |
| 2012/0089764 A1* | 4/2012 | Baskakov | G06F 3/065 |
| | | | 711/6 |
| 2013/0311441 A1* | 11/2013 | Erdogan | G06F 16/245 |
| | | | 707/713 |
| 2014/0279900 A1* | 9/2014 | Gupta | G06F 16/219 |
| | | | 707/634 |
| 2014/0279929 A1* | 9/2014 | Gupta | G06F 16/2365 |
| | | | 707/683 |
| 2014/0279930 A1* | 9/2014 | Gupta | G06F 11/1471 |
| | | | 707/683 |
| 2014/0324785 A1* | 10/2014 | Gupta | G06F 16/2365 |
| | | | 707/689 |
| 2015/0019495 A1* | 1/2015 | Siden | G06F 11/1448 |
| | | | 707/649 |
| 2017/0032005 A1 | 2/2017 | Zheng et al. | |
| 2017/0242871 A1* | 8/2017 | Kilaru | G06F 11/2097 |
| 2017/0270152 A1* | 9/2017 | Gupta | G06F 16/27 |
| 2017/0270175 A1* | 9/2017 | Bantupalli | G06F 16/2365 |
| 2018/0018241 A1* | 1/2018 | Sanocki | H04L 41/22 |

\* cited by examiner

SHARED PAGES FOR DATABASE COPIES

BACKGROUND

While most existing relational databases are not distributed, some existing databases are "scaled out" (as opposed to being "scaled up" by merely employing a larger monolithic system) using one of two common models: a "shared nothing" model, and a "shared disk" model. In general, in a "shared nothing" model, received queries are decomposed into database shards (each of which includes a component of the query), these shards are sent to different compute nodes for query processing, and the results are collected and aggregated before they are returned. In general, in a "shared disk" model, every compute node in a cluster has access to the same underlying data. In systems that employ this model, great care must be taken to manage cache coherency. In both of these models, a large, monolithic database is replicated on multiple nodes (including all of the functionality of a stand-alone database instance), and "glue" logic is added to stitch them together. For example, in the "shared nothing" model, the glue logic may provide the functionality of a dispatcher that subdivides queries, sends them to multiple compute notes, and then combines the results. In a "shared disk" model, the glue logic may serve to fuse together the caches of multiple nodes (e.g., to manage coherency at the caching layer). These "shared nothing" and "shared disk" database systems can be costly to deploy, and complex to maintain, and may over-serve many database use cases.

Figure 1:
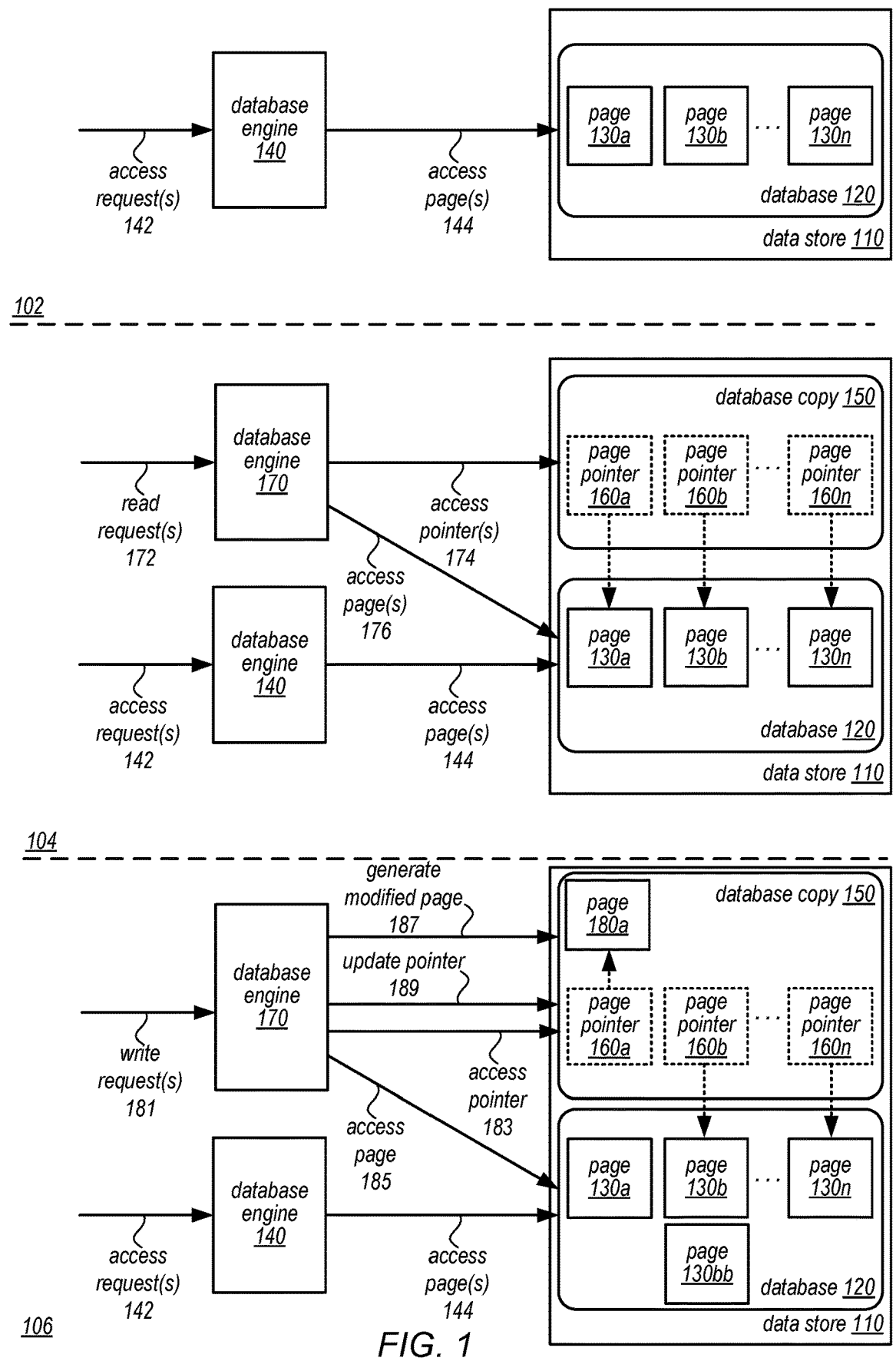
FIG. 1 is a logical block diagram illustrating shared data pages for database copies, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of shared data pages for database copies are described herein. In various embodiments, a database may be utilized to support different systems, applications, or services. Database copies may be created in order to change the database data, the workload of the database, or the operation of the database, in some embodiments, so that access to a database is not disrupted for the different systems, applications, or services—instead the copy of the database can be used to test, develop, or apply the changes. For example, in one embodiment, a copy of a database may be created so that development of an application utilizing the database can be performed. In another embodiment, a copy of a database may be created to run complex, costly, and/or long running queries (e.g., for data science workloads or analyses). Schema changes may be applied to a copy of database, rather than a source database, in order to test or alter the way the database performs (e.g., adding or removing different columns, creating a different index on a different column, etc.), in one embodiment. Tasks to copy or otherwise export data may be performed utilizing a copy of a database, in some embodiments.

Shared data pages for database copies can greatly reduce the amount of time needed to create a copy of a database, in some embodiments. Instead of copying all of the data of a database to a different location to serve as the copy, individual portions of the data stored for a database, such as data pages, may be shared between a copy of database and the source database, in some embodiments. In this way, a copy of a database can become quickly available to perform tasks, such as the different database copy tasks noted above, without disrupting the workload of the source database, in some embodiments. Moreover, shared data pages can reduce the cost of storing a copy of a database, as new data pages for the copy of the database may be created when copy of the database diverges in content from the source database, in some embodiments. FIG. 1 is a logical block diagram illustrating shared data pages for database copies, according to some embodiments.

As illustrated in scene 102, database engine 140 may access a data store 110 that stores database 120, in some embodiments. Database 120 may be a set of data, collection of records, or other grouping of data objects, in one embodiment. Data store 110 may be one or more directly or network attached storage devices, accessible to a database engine 140 (e.g., block-based storage devices like hard disk drives or solid state drives) or may be a separate storage system, such as the storage service discussed below with regard to FIGS. 2-9, which may distribute the data amongst multiple different storage nodes in order to provide redundancy and availability for the data, in some embodiments. In at least some embodiments, data for the database 120 may be stored in one or more portions of data store 110, such as data pages 130a, 130b, through 130n. One or multiple data values, records, or objects may be stored in a data page 130. In at least some embodiments, data pages may include metadata and/or other information for providing access to database 120. For example, data pages 130 may store an index for accessing data and/or schema information for the database in a data dictionary, in one embodiment.

Database engine 140 may receive access request(s) 142 directed to database 120, in some embodiments. For example, database queries, requests to add, remove, or change data values, requests to alter the schema or structure of database 120, or any other request to read or modify the database or modify operation of the database may be received as an access request 142, in some embodiments. Database engine 140 may parse, interpret, and/or execute the access request(s) 142 and access one or more page(s) 144 as part of executing the requests (e.g., changing values of data store in pages 130 or returning the value of data store in pages 130), in some embodiments.

As illustrated in scene 104, a copy of database 120, database copy 150 (sometimes referred to as a clone) may be created, in some embodiments. Creation of a database copy, such as database copy 150 may be performed in response to a request. For example, the request may be received according to an API call, or other programmatic invocation, a command line interface, graphical user interface or console, or any other interface, in one embodiment. The request may identify the database, and may, in some embodiments, identify a point in time for the database which is being copied (e.g., by including a timestamp, sequence number or identifier, etc.). The request may be directed to a database engine, such as database engine 140, or database management system, control plane, or other component with the capability or permission to evaluate and execute requests to create a database copy, in some embodiments.

Pointers, such as page pointer 160a, 160b, and 160n, may be stored in database copy 150 when database copy 150 is created, in various embodiments. These pointers may identify pages from the source database 120 that are shared between database 120 and database copy 150, in one embodiment. For example, page pointer 160a may identify an address, path, or location of page 130a in data store 110, in one embodiment. In this way, database copy 150 may quickly provide access to the data stored in database 120 as a copy, without having to perform an operation to copy the entire content of database 120 to a new location or portion of data store 110, in some embodiments.

For example, database engine 170 may be implemented in order to provide access to database copy 150, in some embodiments. Database engine 170 may receive request(s) to read 172 data from database copy 150, in one embodiment. In order to execute the read requests 172, database engine 170 may access database copy 150, to retrieve the page pointer(s) 160 to the data needed to process the read request 172, and then access 176 the page(s) 130 in data store 110 according to the locations identified by the page pointer(s) 160, in one embodiment. Meanwhile, database engine 140 may still process access request(s) 142 to database 120, in one embodiment.

While the data stored in pages for database copy 150 remains unchanged, pointers 160 can still point to shared data pages 130, in some embodiments. As illustrated in scene 106, however, when a modification is made to data in database copy 150, the database copy 150 may store the change, providing a copy-on-write technique for creating and updating a database copy, in some embodiments. For example, write request(s) 181 may be received at database engine 170 to change one or more data values in a data page, such as the data page identified by page pointer 160a. In order to execute the write request, database engine 170 may access the pointer 183 to access the page 130a in data store 110, in some embodiments. Database engine 170 may then generate and store 187 a modified version of the page, such as page 180a according to the write request (e.g., perform the deletion, value modification, value addition, etc.) as part of database copy 150 in data store 110 and update the pointer 189 to point to the modified version of the page (e.g., pointer 160a points to page 180a), in some embodiments.

As noted above, database engine 140 may still process access request(s) 142 to database 120, in some embodiments. In the event than access request 142 is a request to modify the data in a data page 130 that is shared with database copy 150, such as data page 130b, then a new version of the data page may be generated and stored in database 120, such as data page 130bb, which may be accessed by database engine 140 instead of data page 130b, in some embodiments. As discussed below with regard to FIG. 12, reference counts or other indications of whether a data page is shared may be maintained so that if, for instance, page 130a were to be modified by database engine 140, then a new version of page 130a may be written over the older version of page 130a, in some embodiments.

Please note, FIG. 1 is provided as a logical illustration of a distributed data store providing continuous backup of data, and is not intended to be limiting as to the physical arrangement, size, or number of components, modules, or devices, such as the number of backup nodes, implementing a distributed data store, writer, peer-to-peer replication, or a separate data store maintaining backup data versions.

The specification first describes an example of a database system as a network-based database service that stores data for a database managed by the database service in a separate data storage service, according to various embodiments. Included in the description of the example network-based database service are various aspects of the example network-based database service along with the various interactions between the database service, the storage service, and a separate data store maintaining backup versions of data volumes in the storage service. The specification then describes a flowchart of various embodiments of methods for sharing data pages for database copies. Next, the specification describes an example system that may implement the disclosed techniques. Various examples are provided throughout the specification.

The systems described herein may, in some embodiments, implement a network-based service that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

More specifically, the systems described herein may, in some embodiments, implement a service-oriented architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., query processing, transaction management, caching and storage) into tiers that may be individually and independently scalable. For example, in some embodiments, each database instance in the systems described herein may include a database tier (which may include a single database engine head node and a client-side storage system driver), a separate, distributed storage system (which may include multiple storage nodes that collectively perform some of the operations traditionally performed in the database tier of existing systems), and a backup storage tier.

As described in more detail herein, in some embodiments, some of the lowest level operations of a database, (e.g., backup, restore, recovery, log record manipulation, and/or various space management operations) may be offloaded from the database engine to the storage layer (or tier), such as a distributed storage system, and distributed across multiple nodes and storage devices. For example, in some embodiments, rather than the database engine applying changes to a database (or data pages thereof) and then sending the modified data pages to the storage layer, the application of changes to the stored database (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process). Log sequence numbers may be assigned to the redo log records from a log sequence number space. In some embodiments, crash recovery (e.g., the rebuilding of data pages from stored redo log records) may also be performed by the storage layer and may also be performed by a distributed (and, in some cases, lazy) background process. In some embodiments, the storage layer may maintain backup versions of data volumes in a separate storage system (e.g., another storage service implemented as part of network-based services platform 200) by leveraging peer-to-peer replication among storage nodes to identify and obtain new updates to data volumes for inclusion in backup versions.

In some embodiments, because only redo logs (and not modified data pages) are sent to the storage layer, there may be much less network traffic between the database tier and the storage layer than in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time.

In various embodiments, a database instance may include multiple functional components (or layers), each of which provides a portion of the functionality of the database instance. In one such example, a database instance may include a query parsing and query optimization layer, a query execution layer, a transactionality and consistency management layer, and a durability and space management layer. Rather than duplicating an entire database instance one or more times and adding glue logic to stitch them together to scale a database, the systems described herein may instead offload the functionality of durability and space management layer from the database tier to a separate storage layer, and may distribute that functionality across multiple storage nodes in the storage layer, in some embodiments.

In some embodiments, the database systems described herein may retain much of the structure of the upper half of the database instance, such as query parsing and query optimization layer, a query execution layer, and a transactionality and consistency management layer, but may redistribute responsibility for at least portions of the backup, restore, snapshot, recovery, and/or various space management operations to the storage tier. Redistributing functionality in this manner and tightly coupling log processing between the database tier and the storage tier may improve performance, increase availability and reduce costs, when compared to previous approaches to providing a scalable database, in some embodiments. For example, network and input/output bandwidth requirements may be reduced, since only redo log records (which are much smaller in size than the actual data pages) may be shipped across nodes or persisted within the latency path of write operations. In addition, the generation of data pages can be done independently in the background on each storage node (as foreground processing allows), without blocking incoming write operations. In some embodiments, the use of log-structured, non-overwrite storage may allow copy creation, backup, restore, snapshots, point-in-time recovery, and volume growth operations to be performed more efficiently, e.g., by using metadata manipulation rather than movement or copying of a data page. In some embodiments, the storage layer may also assume the responsibility for the replication of data stored on behalf of clients (and/or metadata associated with that data, such as redo log records) across multiple storage nodes. For example, data (and/or metadata) may be replicated locally (e.g., within a single "availability zone" in which a collection of storage nodes executes on its own physically distinct, independent infrastructure) and/or across availability zones in a single region or in different regions, in one embodiment.

In various embodiments, the database systems described herein may support a standard or custom application programming interface (API) for a variety of database operations. For example, the API may support operations for creating a database, creating a table, altering a table, creating a user, dropping a user, inserting one or more rows in a table, copying values, selecting data from within a table (e.g., querying a table), canceling or aborting a query, creating a snapshot, and/or other operations.

In some embodiments, the database tier of a database instance may include a database engine head node server that receives read and/or write requests from various client programs (e.g., applications) and/or subscribers (users), then parses them and develops an execution plan to carry out the associated database operation(s). For example, the database engine head node may develop the series of steps necessary to obtain results for complex queries and joins. In some embodiments, to the database engine head node may manage communications between the database tier of the database system and clients/subscribers, as well as communications between the database tier and a separate distributed storage system.

In some embodiments, the database engine head node may be responsible for receiving SQL requests from end clients through a JDBC or ODBC interface and for performing SQL processing and transaction management (which may include locking) locally. However, rather than generating data pages locally, the database engine head node (or various components thereof) may generate redo log records and may ship them to the appropriate nodes of a separate distributed storage system. In some embodiments, a client-side driver for the distributed storage system may be hosted on the database engine head node and may be responsible for routing redo log records to the storage system node (or nodes) that store the segments (or data pages thereof) to which those redo log records are directed. For example, in some embodiments, each segment may be mirrored (or otherwise made durable) on multiple storage system nodes that form a protection group. In such embodiments, the client-side driver may keep track of the nodes on which each segment is stored and may route redo logs to all of the nodes on which a segment is stored (e.g., asynchronously and in parallel, at substantially the same time), when a client request is received. As soon as the client-side driver receives an acknowledgement back from a write quorum of the storage nodes in the protection group (which may indicate that the redo log record has been written to the storage node), it may send an acknowledgement of the requested change to the database tier (e.g., to the database engine head node). For example, in embodiments in which data is made durable through the use of protection groups, the database engine head node may not be able to commit a transaction until and unless the client-side driver receives a reply from enough storage node instances to constitute a write quorum, as may be defined in a protection group policy for the data.

In some embodiments, the database tier (or more specifically, the database engine head node) may include a cache in which recently accessed data pages are held temporarily. In such embodiments, if a write request is received that targets a data page held in such a cache, in addition to shipping a corresponding redo log record to the storage layer, the database engine may apply the change to the copy of the data page held in its cache. A data page held in this cache may not ever be flushed to the storage layer, and it may be discarded at any time (e.g., at any time after the redo log record for a write request that was most recently applied to the cached copy has been sent to the storage layer and acknowledged). The cache may implement any of various locking mechanisms to control access to the cache by at most one writer (or multiple readers) at a time, in different embodiments. Note, however, that in embodiments that include such a cache, the cache may not be distributed across multiple nodes, but may exist only on the database engine head node for a given database instance. Therefore, there may be no cache coherency or consistency issues to manage.

In some embodiments, the database tier may support the use of synchronous or asynchronous read replicas in the system, e.g., read-only copies of data on different nodes of the database tier to which read requests can be routed. In such embodiments, if the database engine head node for a given database receives a read request directed to a particular data page, it may route the request to any one (or a particular one) of these read-only copies. In some embodiments, the client-side driver in the database engine head node may notify these other nodes about updates and/or invalidations to cached data pages (e.g., in order to prompt them to invalidate their caches, after which they may request updated copies of updated data pages from the storage layer).

In some embodiments, the client-side driver running on the database engine head node may expose a private interface to the storage tier. In some embodiments, it may also expose a traditional iSCSI interface to one or more other components (e.g., other database engines or virtual computing services components). In some embodiments, storage for a database instance in the storage tier may be modeled as a single volume that can grow in size without limits, and that can have an unlimited number of IOPS associated with it. When a volume is created, it may be created with a specific size, with a specific availability/durability characteristic (e.g., specifying how it is replicated), and/or with an IOPS rate associated with it (e.g., both peak and sustained). For example, in some embodiments, a variety of different durability models may be supported, and users/subscribers may be able to specify, for their database, a number of replication copies, zones, or regions and/or whether replication is synchronous or asynchronous based upon their durability, performance and cost objectives.

In some embodiments, the client side driver may maintain metadata about the volume and may directly send asynchronous requests to each of the storage nodes necessary to fulfill read requests and write requests without requiring additional hops between storage nodes. The volume metadata may indicate which protection groups, and their respective storage nodes, maintain which partitions of the volume, in some embodiments. For example, in some embodiments, in response to a request to make a change to a database, the client-side driver may determine the protection group, and its one or more nodes that are implementing the storage for the targeted data page, and to route the redo log record(s) specifying that change to those storage nodes. The storage nodes may then be responsible for applying the change specified in the redo log record to the targeted data page at some point in the future, in some embodiments. As writes are acknowledged back to the client-side driver, the client-side driver may advance the point at which the volume is durable and may acknowledge commits back to the database tier, in some embodiments. As previously noted, in some embodiments, the client-side driver may not ever send data pages to the storage node servers. This may not only reduce network traffic, but may also remove the need for the checkpoint or background writer threads that constrain foreground-processing throughput in previous database systems.

In some embodiments, many read requests may be served by the database engine head node cache. However, write requests may require durability, since large-scale failure events may be too common to allow only in-memory replication. Therefore, the systems described herein may minimize the cost of the redo log record write operations that are in the foreground latency path by implementing data storage in the storage tier as two regions: a small append-only log-structured region into which redo log records are written when they are received from the database tier, and a larger region in which log records are coalesced together to create new versions of data pages in the background. In some embodiments, an in-memory structure may be maintained for each data page that points to the last redo log record for that page, backward chaining log records until an instantiated data block is referenced. This approach may provide good performance for mixed read-write workloads, including in applications in which reads are largely cached.

In some embodiments, copies of databases may be created in the storage tier that share data pages with the source of the copy. For example, a copy of a portion of a database (e.g., an extent of a database volume), may be stored on the same storage node as the source database and include pointers to data pages stored in the source database so that the resulting amount of storage consumed by the copy is limited to storing changes to data pages that differ from the original copy, providing a copy-on-write technique for creating and updating copies of a database.

Figure 2:
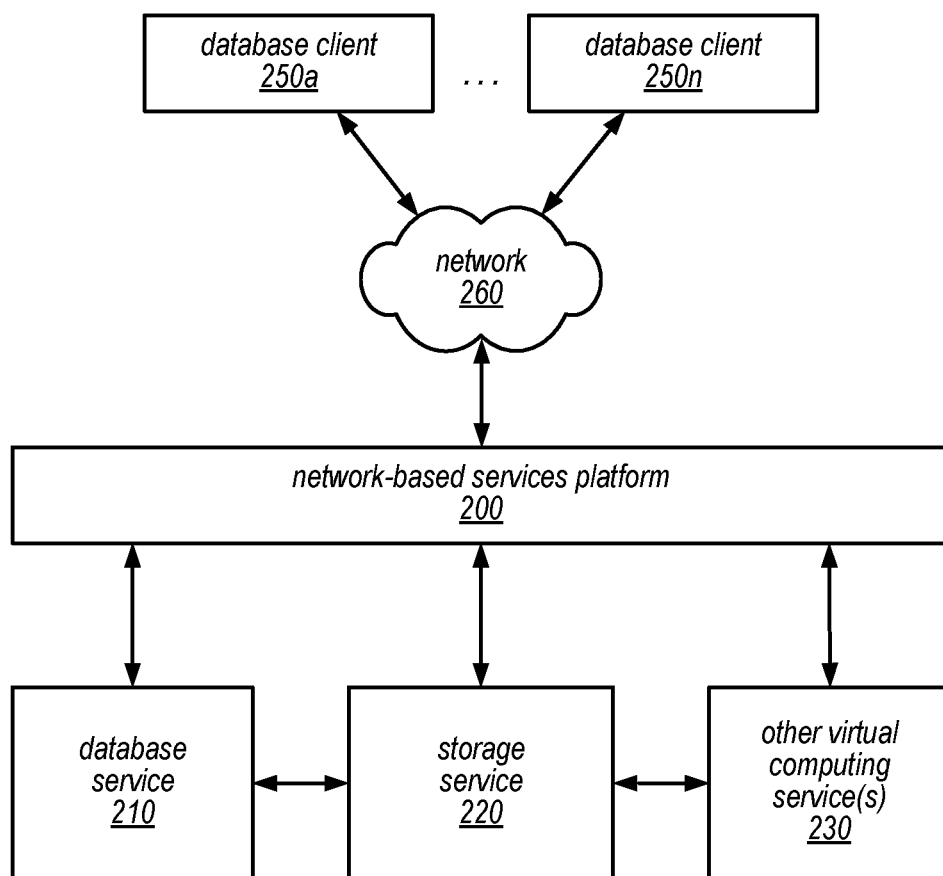
FIG. 2 is a logical block diagram illustrating a service system architecture for a network-based database service and a network-based storage service that utilize shared data pages in the storage service to create copies of a database managed in the database service, according to some embodiments.

FIG. 2 is a logical block diagram illustrating a service system architecture for a network-based database service and a network-based storage service that utilize shared data pages in the storage service to create copies of a database managed in the database service, according to some embodiments. In the illustrated embodiment, a number of clients (shown as clients 250a-250n) may interact with a network-based services platform 200 via a network 260. Network-based services platform 200 may interface with one or more instances of a database service 210, a distributed storage service 220 and/or one or more other virtual computing services 230. Storage service may be implemented as log-structured storage using a single log sequence number space. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 14 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Clients 250 may encompass any type of client configurable to submit network-based services requests to network-based services platform 200 via network 260, including requests for database services (e.g., a request to create a copy of a database, etc.). For example, a given client 250 may include a suitable version of a web browser, or may include a plug-in module or other type of code module that can execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more databases. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with network-based services platform 200. In some embodiments, client 250 may generate network-based services requests according to a Representational State Transfer (REST)-style network-based services architecture, a document- or message-based network-based services architecture, or another suitable network-based services architecture.

In some embodiments, a client 250 (e.g., a database service client) may provide access to storage of databases to other applications in a manner that is transparent to those applications. For example, client 250 may integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model. Instead, the details of interfacing to network-based services platform 200 may be coordinated by client 250 and the operating system or file system on behalf of applications executing within the operating system environment.

Clients 250 may convey network-based services requests (e.g., request to create a copy of a database, queries to a database, etc.) to and receive responses from network-based services platform 200 via network 260. In various embodiments, network 260 may encompass any suitable combination of networking hardware and protocols necessary to establish network-based-based communications between clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 200. It is noted that in some embodiments, clients 250 may communicate with network-based services platform 200 using a private network rather than the public Internet. For example, clients 250 may be provisioned within the same enterprise as a database service system (e.g., a system that implements database service 210 and/or distributed storage service 220). In such a case, clients 250 may communicate with platform 200 entirely through a private network 260 (e.g., a LAN or WAN that may use Internet-based communication protocols but which is not publicly accessible).

Generally speaking, network-based services platform 200 may implement one or more service endpoints that receive and process network-based services requests, such as requests to access data pages (or records thereof). For example, network-based services platform 200 may include hardware and/or software may implement a particular endpoint, such that an HTTP-based network-based services request directed to that endpoint is properly received and processed. In one embodiment, network-based services platform 200 may be implemented as a server system may receive network-based services requests from clients 250 and to forward them to components of a system that implements database service 210, storage service 220 and/or another virtual computing service 230 for processing (e.g. another data storage service, such as an object data store which may store data objects that make up a backup version data volumes stored in the storage service 220. In other embodiments, network-based services platform 200 may be implemented as a number of distinct systems (e.g., in a cluster topology) implementing load balancing and other request management features to dynamically manage large-scale network-based services request processing loads. In various embodiments, network-based services platform 200 may support REST-style or document-based (e.g., SOAP-based) types of network-based services requests.

In addition to functioning as an addressable endpoint for clients' network-based services requests, in some embodiments, network-based services platform 200 may implement various client management features, in some embodiments. For example, platform 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter, in some embodiments. Platform 200 may also implement financial accounting and billing systems, or may maintain a database of usage data that may be queried and processed by external systems for reporting and billing of client usage activity. In certain embodiments, platform 200 may collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics, in some embodiments. In some embodiments such metrics may be used by system administrators to tune and maintain system components, while in other embodiments such metrics (or relevant portions of such metrics) may be exposed to clients 250 to enable such clients to monitor their usage of database service 210, distributed storage service 220 and/or another virtual computing service 230 (or the underlying systems that implement those services).

In some embodiments, network-based services platform 200 may also implement user authentication and access control procedures. For example, for a given network-based services request to access a particular database, platform 200 may ascertain whether the client 250 associated with the request is authorized to access the particular database. Platform 200 may determine such authorization by, for example, evaluating an identity, password or other credential against credentials associated with the particular database, or evaluating the requested access to the particular database against an access control list for the particular database, in some embodiments. For example, if a client 250 does not have sufficient credentials to access the particular database, platform 200 may reject the corresponding network-based services request, for example by returning a response to the requesting client 250 indicating an error condition. Various access control policies may be stored as records or lists of access control information by database service 210, storage service 220 and/or other virtual computing services 230, in some embodiments.

It is noted that while network-based services platform 200 may represent the primary interface through which clients 250 may access the features of a database system that implements database service 210, it need not represent the sole interface to such features. For example, an alternate API that may be distinct from a network-based services interface may be used to allow clients internal to the enterprise providing the database system to bypass network-based services platform 200. Note that in many of the examples described herein, distributed storage service 220 may be internal to a computing system or an enterprise system that provides database services to clients 250, and may not be exposed to external clients (e.g., users or client applications). In such embodiments, the internal "client" (e.g., database service 210) may access distributed storage service 220 over a local or private network, (e.g., through an API directly between the systems that implement these services). In such embodiments, the use of distributed storage service 220 in storing databases on behalf of clients 250 may be transparent to those clients. In other embodiments, distributed storage service 220 may be exposed to clients 250 through network-based services platform 200 to provide storage of databases or other information for applications other than those that rely on database service 210 for database management. In such embodiments, clients of the distributed storage service 220 may access storage service 220 via network 260 (e.g., over the Internet). In some embodiments, a virtual computing service 230 receive storage services from storage service 220 (e.g., through an API directly between the virtual computing service 230 and storage service 220) to store objects used in performing computing services 230 on behalf of a client 250. In some cases, the accounting and/or credentialing services of platform 200 may be unnecessary for internal clients such as administrative clients or between service components within the same enterprise.

Although not illustrated, in various embodiments, storage service 220 may interface with backup data store, system, service, or device. Various data, such as data pages, log records, and/or any other data maintained by distributed storage service internal clients, such as database service 210 or other virtual computing services 230, and/or external clients such as clients 250a through 250n, may be sent to a backup data store.

Note that in various embodiments, different storage policies may be implemented by database service 210 and/or storage service 220. Examples of such storage policies may include a durability policy (e.g., a policy indicating the number of instances of a database (or data page thereof) that will be stored and the number of different nodes on which they will be stored) and/or a load balancing policy (which may distribute databases, or data pages thereof, across different nodes, volumes and/or disks in an attempt to equalize request traffic). In addition, different storage policies may be applied to different types of stored items by various one of the services. For example, in some embodiments, storage service 220 may implement a higher durability for redo log records than for data pages.

Figure 3:
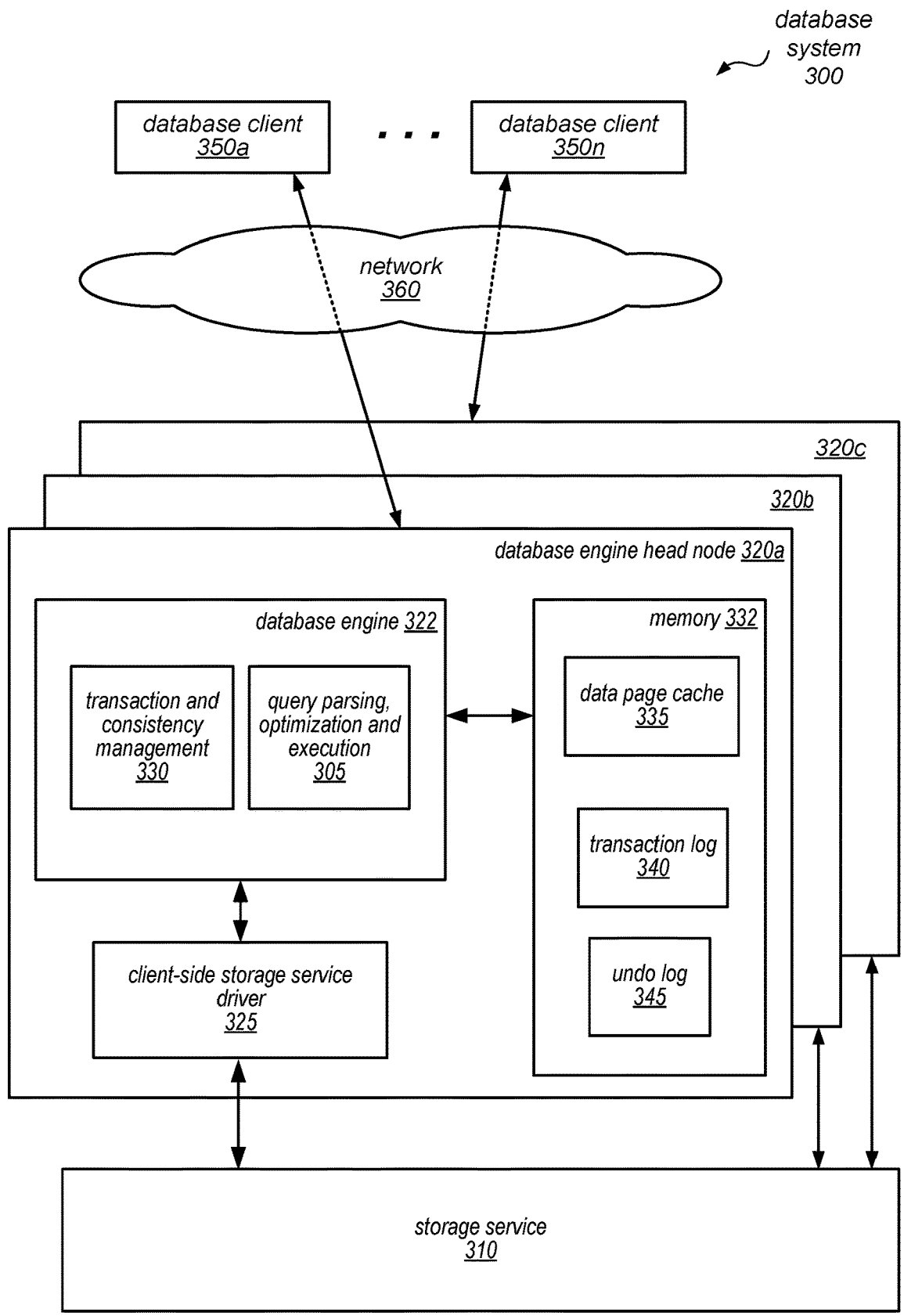
FIG. 3 is a block diagram illustrating various components of a database system that includes a database engine and a separate distributed storage service, according to some embodiments.

FIG. 3 is a block diagram illustrating various components of a database system that includes a database engine and a separate storage service, according to one embodiment. In this example, database system 300 includes a respective database engine head node 320 for each of several databases and a distributed storage service 310 (which may or may not be visible to the clients of the database system, shown as database clients 350a-350n). As illustrated in this example, one or more of database clients 350a-350n may access a database head node 320 (e.g., head node 320a, head node 320b, or head node 320c, each of which is a component of a respective database instance) via network 360 (e.g., these components may be network-addressable and accessible to the database clients 350a-350n). However, storage service 310, which may be employed by the database system to store a database volume (such as data pages of one or more databases, as well as redo log records and/or other metadata associated therewith) and/or copies of a database volume on behalf of database clients 350a-350n, and to perform other functions of the database system as described herein, may or may not be network-addressable and accessible to the storage clients 350a-350n, in different embodiments. For example, in some embodiments, storage service 310 may perform various storage, access, change logging, recovery, log record manipulation, and/or space management operations in a manner that is invisible to storage clients 350a-350n.

As previously noted, each database instance may include a single database engine head node 320 that receives requests (e.g., queries to read or write data, etc.) from various client programs (e.g., applications) and/or subscribers (users), then parses them, optimizes them, and develops an execution plan to carry out the associated database operation(s). In the example illustrated in FIG. 3, a query parsing, optimization, and execution component 305 of database engine head node 320a may perform these functions for queries that are received from database client 350a and that target the database instance of which database engine head node 320a is a component. In some embodiments, query parsing, optimization, and execution component 305 may return query responses to database client 350a, which may include write acknowledgements, requested data pages (or portions thereof), error messages, and or other responses, as appropriate. As illustrated in this example, database engine head node 320a may also include a client-side storage service driver 325, which may route read requests and/or redo log records to various storage nodes within storage service 310, receive write acknowledgements from storage service 310, receive requested data pages from storage service 310, and/or return data pages, error messages, or other responses to query parsing, optimization, and execution component 305 (which may, in turn, return them to database client 350a). Client-side storage device may maintain mapping information about the database volume stored in storage service 310, such that a particular protection group maintaining a partition of the database volume may be determined. Read requests and redo log records may then be routed to storage nodes that are members of the protection group according to the partition of user data to which the read request is directed or to which the redo log record pertains.

In this example, database engine head node 320a includes a data page cache 335, in which data pages that were recently accessed may be temporarily held. As illustrated in FIG. 3, database engine head node 320a may also include a transaction and consistency management component 330, which may be responsible for providing transactionality and consistency in the database instance of which database engine head node 320a is a component. For example, this component may be responsible for ensuring the Atomicity, Consistency, and Isolation properties of the database instance and the transactions that are directed that the database instance. As illustrated in FIG. 3, database engine head node 320a may also include a transaction log 340 and an undo log 345, which may be employed by transaction and consistency management component 330 to track the status of various transactions and roll back any locally cached results of transactions that do not commit.

Note that each of the other database engine head nodes 320 illustrated in FIG. 3 (e.g., 320b and 320c) may include similar components and may perform similar functions for queries received by one or more of database clients 350a-350n and directed to the respective database instances of which it is a component.

In some embodiments, the storage systems described herein may organize data in various logical data volumes, extents (which may include partitions of the database (e.g., user data space) in the volume and a segmentation of the log for the volume) made durable among a protection group of storage nodes, segments (which may be data stored on an individual storage node of a protection group) and pages for storage on one or more storage nodes. For example, in some embodiments, each database is represented by a logical volume, and each logical volume is partitioned over a collection of storage nodes into extents. A protection group may be composed of different storage nodes in the storage service that together make an extent durable. Multiple segments, each of which lives on a particular one of the storage nodes in a protection group, are used to make the extent durable.

In some embodiments, each data page may be stored in a segment, such that each segment stores a collection of one or more data pages and a change log (also referred to as a redo log) (e.g., a log of redo log records) for each data page that it stores. Thus, change logs may be log records segmented to the protection group of which the segment is a member. As described in detail herein, the storage nodes may receive redo log records (which may also be referred to herein as ULRs) and to coalesce them to create new versions of the corresponding data pages (e.g., if a data page of a copy of a database is shared with the database and the new version is created to create a different version included in the copy and not visible to the database) and/or additional or replacement log records (e.g., lazily and/or in response to a request for a data page or a database crash). In some embodiments, data pages and/or change logs may be mirrored across multiple storage nodes, according to a variable configuration, such as in a protection group (which may be specified by the client on whose behalf the databases are being maintained in the database system). For example, in different embodiments, one, two, or three copies of the data or change logs may be stored in each of one, two, or three different availability zones or regions, according to a default configuration, an application-specific durability preference, or a client-specified durability preference.

Figure 4:
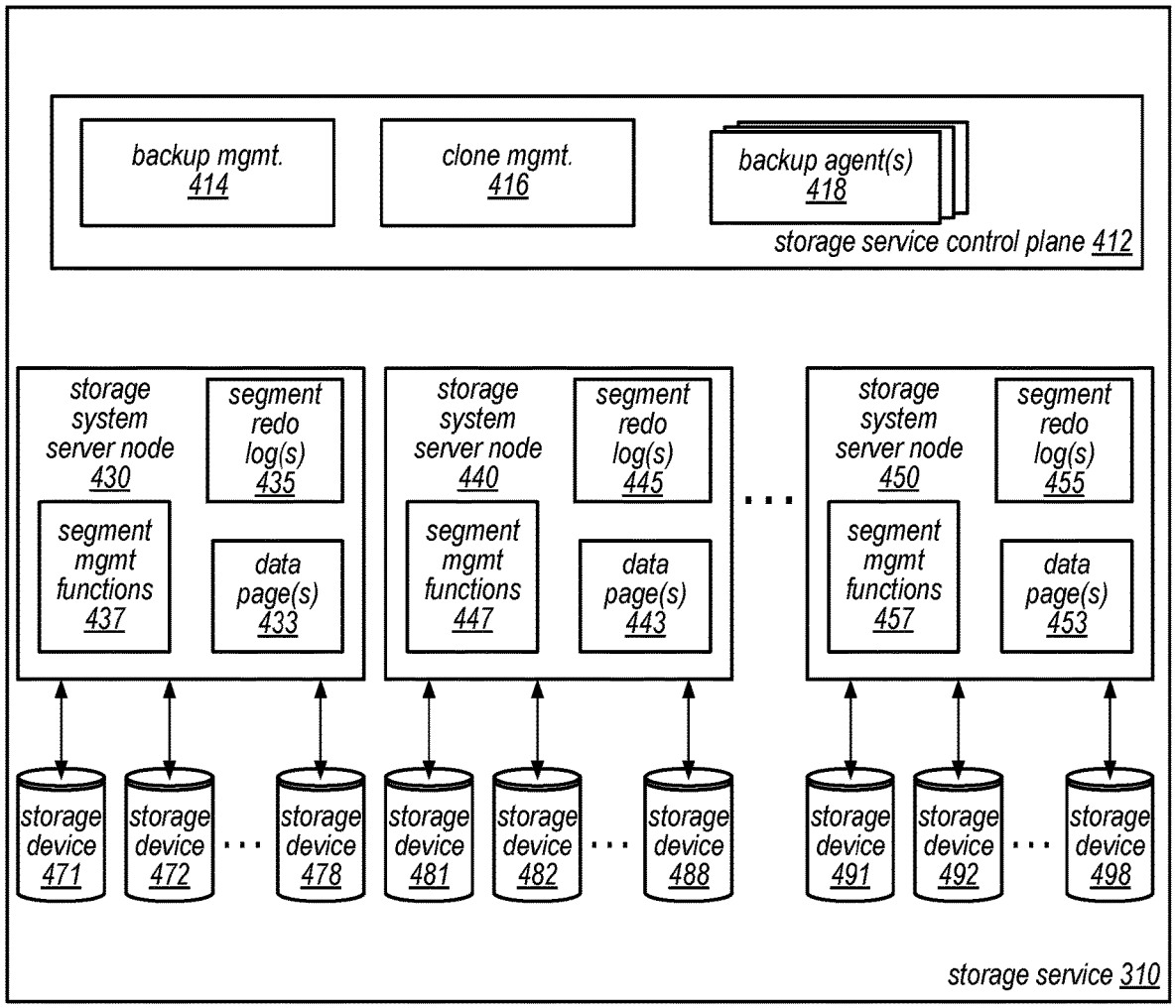
FIG. 4 is a logical block diagram illustrating a distributed storage system and backup and restore service for the distributed storage system, according to some embodiments.

One embodiment of a storage service is illustrated by the block diagram in FIG. 4. In at least some embodiments, storage nodes 430-450 may store data for different clients as part of a multi-tenant storage service. For example, the various segments discussed above and below with regard to FIG. 6, may correspond to different protection groups and volumes for different clients.

In some embodiments, a client, such as a database engine head node, may communicate with storage system server nodes that store data as part of a database managed by a client-side storage service driver at the client. In this example, storage service includes multiple storage system server nodes (including those shown as 430, 440, and 450), each of which includes storage for data pages and redo logs for the segment(s) it stores, and hardware and/or software may perform various segment management functions 437. For example, each storage system server node may include hardware and/or software may perform at least a portion of any or all of the following operations: replication (locally, e.g., within the storage node), coalescing of redo logs to generate data pages, log management (e.g., manipulating log records), crash recovery (e.g., determining candidate log records for volume recovery), creating copies of segments stored at the storage node (e.g., full type copies or shared type copies) and/or space management (e.g., for a segment). Each storage system server node may also have multiple attached storage devices (e.g., SSDs, HDDs, or other persistent storage devices) on which data blocks may be stored on behalf of clients (e.g., users, client applications, and/or database service subscribers).

In the example illustrated in FIG. 4, storage system server node 430 includes data page(s) 433, segment redo log(s) 435 (as discussed in more detail below with regard to FIG. 7) segment management functions 437, and attached storage devices 471-478. Similarly, storage system server node 440 includes data page(s) 443, segment redo log(s) 445, segment management functions 447, and attached storage devices 481-488; and storage system server node 450 includes data page(s) 453, segment redo log(s) 455, segment management functions 457, and attached storage devices 491-498.

In some embodiments, each of the storage system server nodes in the storage system may implement a set of processes running on the node server's operating system that manage communication with the database engine head node, e.g., to receive redo logs, send back data pages, etc. In some embodiments, all data blocks written to the storage system may be backed up to long-term and/or archival storage (e.g., in a remote key-value durable backup storage system), as discussed below with regard to FIGS. 5 and 8.

In some embodiments, storage service 310 may also implement a storage service control plane 412. Storage service control plane 412 may be one or more compute nodes that may perform a variety of different storage system management functions. For example, storage control plane may implement a volume manager (not illustrated), which may maintain mapping information or other metadata for a volume, such as current volume state, current writer, truncation tables or other truncation information, or any other information for a volume as it is persisted in varying different, extents, segments, and protection groups. The volume manager may communicate with a client of storage system 410, such as client-side driver in order to "mount" or "open" the volume for the client, providing the client-side driver with mapping information, protection group policies, and various other information necessary to send write and read requests to storage nodes 430-450. The volume manager may provide the maintained information to storage clients, such as a database engine head node or client-side driver or to other system components such as backup agents 418. For example, the volume manager may provide a current volume state (e.g., clean, dirty or recovery), current epoch or other version indicator for the volume and/or any other information about the data volume.

In at least some embodiments, storage service control plane 412 may implement backup management 414. Backup management 414 may implement or direct multiple backup agents 418 which may backup data volumes stored at storage nodes. For example, in some embodiments task queue(s) may be implemented that identify backup operations to be performed with respect to data volumes (e.g., describing the range of LSNs of redo log records being included in a chunk or portion of data that is to be uploaded to the backup data store). Volume backup metadata may be included as part of the backup performed by backup agent(s) 418, including the volume geometry or configuration (e.g., as discussed below with regard to FIG. 9, including various extents, protection groups, stripes, etc.) and other information to generate a restored version of a data volume from data chunks stored in the separate backup data store. As discussed above with regard to FIG. 1, copies of databases may be performed using shared data pages. Backups of the copies of the databases that copy the new versions of data pages generated for a copy without copying the shared data pages (which may be stored in a backup of the source database that generated the copy), in some embodiments.

In at least some embodiments, storage service control plane 412 may implement copy management 416. Copy management 416 may handle or direct the operation of request to create database copies, in some embodiments (e.g., received from network-based services platform 200, a client such as a database engine head node or client-side storage driver, or directly from a client). For example, as discussed below with regard to FIG. 11, the storage nodes in the protection groups storing the extents of a database volume may be identified and a determination may be made as to whether shared type copies or full copies of segments in the protection group should be performed, in one embodiment. Copy management 416 may direct the creation of shared type copies of a database by creating page mapping or other information that includes pointers to the data pages stored in a segment of a database being copied, in some embodiments. Copy management 416 may direct the creation of full type copies of a database by directing the copying from storage node(s) (or backup) the data pages of the segment of the database to be stored as a full type copy of the database, in some embodiments.

Figure 5:
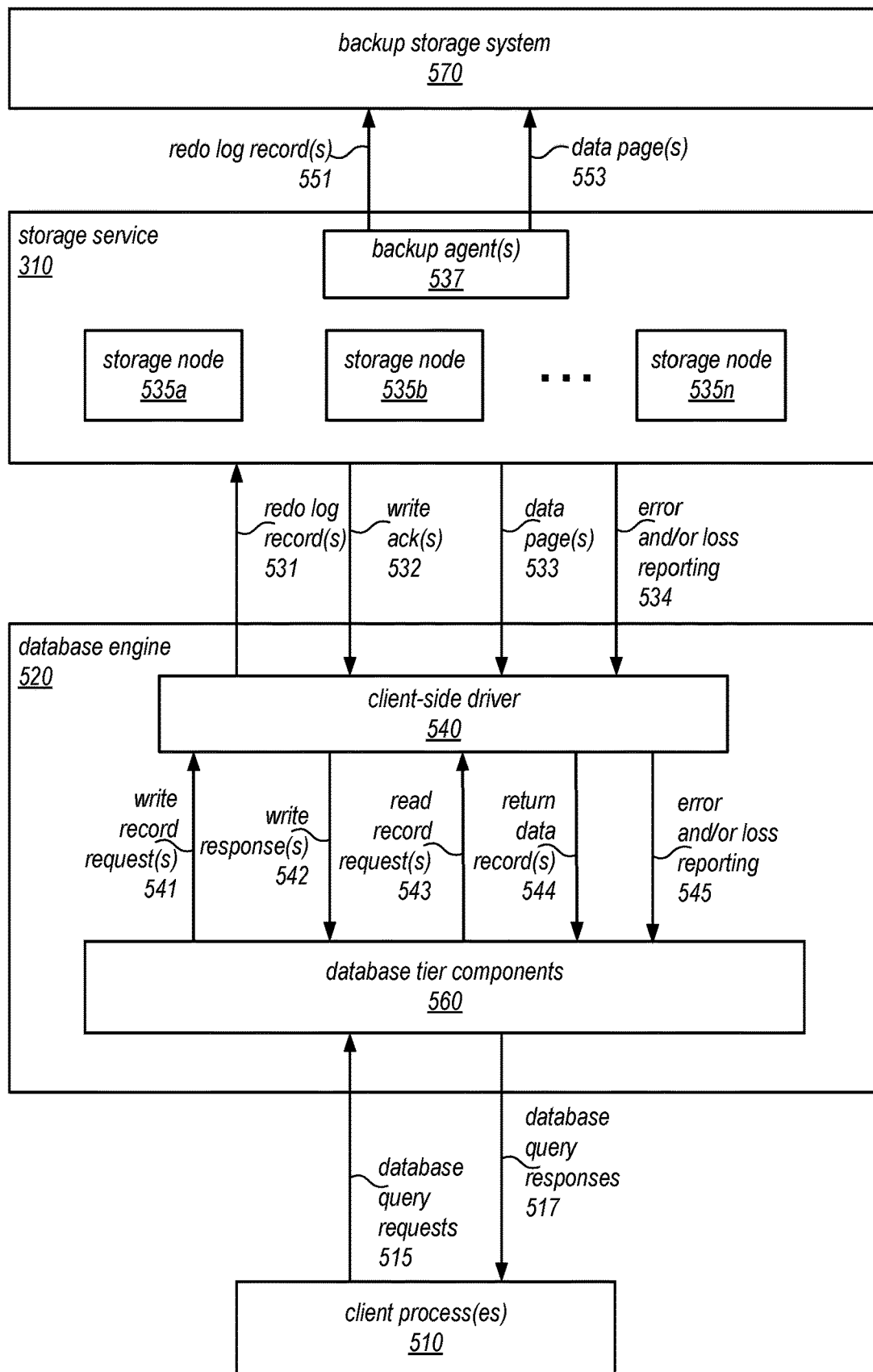
FIG. 5 is a logical block diagram illustrating the use of a separate distributed storage system in a database system, according to some embodiments.

FIG. 5 is a block diagram illustrating the use of a separate storage system in a database system, according to one embodiment. In this example, one or more client processes 510 may store data to one or more databases maintained by a database system that includes a database engine 520 and a storage system 530. In the example illustrated in FIG. 5, database engine 520 includes database tier components 560 and client-side driver 540 (which serves as the interface between storage system 530 and database tier components 560). In some embodiments, database tier components 560 may perform functions such as those performed by query parsing, optimization and execution component 305 and transaction and consistency management component 330 of FIG. 3, and/or may store data pages, transaction logs and/or undo logs (such as those stored by data page cache 335, transaction log 340 and undo log 345 of FIG. 3). In various embodiments, database engine 520 may have obtained a volume epoch indicator or other identifier from storage system 530 granting access writes to a particular data volume, such as by sending a request to open the data volume to storage system 530.

In this example, one or more client processes 510 may send database query requests 515 (which may include read and/or write requests targeting data stored on one or more of the storage nodes 535a-535n) to database tier components 560, and may receive database query responses 517 from database tier components 560 (e.g., responses that include write acknowledgements and/or requested data). Each database query request 515 that includes a request to write to a data page may be parsed and optimized to generate one or more write record requests 541, which may be sent to client-side driver 540 for subsequent routing to storage system 530. In this example, client-side driver 540 may generate one or more redo log records 531 corresponding to each write record request 541, and may send them to specific ones of the storage nodes 535 of specific protection groups storing the partition user data of user data space to which the write record request pertains in storage system 530. Storage nodes 535 may perform various peer-to-peer communications to replicate redo log records 531 received at a storage node to other storage nodes that may have not received the redo log records 431. For instance, not every storage node may receive a redo log record in order to satisfy a write quorum (e.g., 3 out of 5 storage nodes may be sufficient). The remaining storage nodes that do not receive or acknowledge the redo log record may receive an indication of it from a peer storage node that did acknowledge or receive the redo log record. Client-side driver 540 may generate metadata for each of the redo log records that includes an indication of a previous log sequence number of a log record maintained at the specific protection group. storage system 530 may return a corresponding write acknowledgement(s) 523 for each redo log record 531 to database engine 520 (specifically to client-side driver 540). Client-side driver 540 may pass these write acknowledgements to database tier components 560 (as write responses 542), which may then send corresponding responses (e.g., write acknowledgements) to one or more client processes 510 as one of database query responses 517.

In this example, each database query request 515 that includes a request to read a data page may be parsed and optimized to generate one or more read record requests 543, which may be sent to client-side driver 540 for subsequent routing to storage system 530. In this example, client-side driver 540 may send these requests to specific ones of the storage nodes 535 of storage system 530, and storage system 530 may return the requested data pages 533 to database engine 520 (specifically to client-side driver 540). Client-side driver 540 may send the returned data pages to the database tier components 560 as return data records 544, and database tier components 560 may then send the data pages to one or more client processes 510 as database query responses 517.

In some embodiments, various error and/or data loss messages 534 may be sent from storage system 530 to database engine 520 (specifically to client-side driver 540). These messages may be passed from client-side driver 540 to database tier components 560 as error and/or loss reporting messages 545, and then to one or more client processes 510 along with (or instead of) a database query response 517.

In some embodiments, backup nodes 537 may receive peer-to-peer indications from storage nodes 535. By evaluating these indications backup nodes 537 may identify additional redo log records received at storage nodes 535 that have not been backed up. Backup node(s) 537 may send chunks or objects containing a set of redo log records 551 to backup storage system 570 to be stored as part of a backup version of the data volume. In some embodiments, data pages 553 to create a full backup of the data volume (as opposed to log records describing the changes to the data volume) or copy of the data volume that may reference data pages stored in another data volume in backup storage system 570 may be requested from storage nodes and sent to backup storage system 570.

In some embodiments, the APIs 531-534 of storage system 530 and the APIs 541-545 of client-side driver 540 may expose the functionality of the storage system 530 to database engine 520 as if database engine 520 were a client of storage system 530. For example, database engine 520 (through client-side driver 540) may write redo log records or request data pages through these APIs to perform (or facilitate the performance of) various operations of the database system implemented by the combination of database engine 520 and storage system 530 (e.g., storage, access, change logging, recovery, and/or space management operations). As illustrated in FIG. 5, storage system 530 may store data blocks on storage nodes 535a-535n, each of which may have multiple attached SSDs. In some embodiments, storage system 530 may provide high durability for stored data block through the application of various types of redundancy schemes.

Note that in various embodiments, the API calls and responses between database engine 520 and storage system 530 (e.g., APIs 531-534) and/or the API calls and responses between client-side driver 540 and database tier components 560 (e.g., APIs 541-545), and between storage system 430 and backup data store 570 in FIG. 5 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of network-based services. REST is an architectural style for hypermedia systems. A RESTful API (which may also be referred to as a RESTful network-based service) is a network-based service API implemented using HTTP and REST technology. The APIs described herein may in some embodiments be wrapped with client libraries in various languages, including, but not limited to, C, C++, Java, C# and Perl to support integration with system components.

In the storage systems described herein, an extent may be a logical concept representing a highly durable unit of storage that can be combined with other extents (either concatenated or striped) to represent a volume. Each extent may be made durable by membership in a single protection group. An extent may provide an LSN-type read/write interface for a contiguous byte sub-range having a fixed size that is defined at creation. Read/write operations to an extent may be mapped into one or more appropriate segment read/write operations by the containing protection group. As used herein, the term "volume extent" may refer to an extent that is used to represent a specific sub-range of bytes within a volume.

As noted above, a data volume may consist of multiple extents, each represented by a protection group consisting of one or more segments. In some embodiments, log records directed to different extents may have interleaved LSNs. For changes to the volume to be durable up to a particular LSN it may be necessary for all log records up to that LSN to be durable, regardless of the extent to which they belong. In some embodiments, the client may keep track of outstanding log records that have not yet been made durable, and once all ULRs up to a specific LSN are made durable, it may send a Volume Durable LSN (VDL) message to one of the protection groups in the volume. The VDL may be written to all synchronous mirror segments (i.e. group members) for the protection group. This is sometimes referred to as an "Unconditional VDL" and it may be periodically persisted to various segments (or more specifically, to various protection groups) along with write activity happening on the segments. In some embodiments, the Unconditional VDL may be stored in log sector headers.

Figure 6:
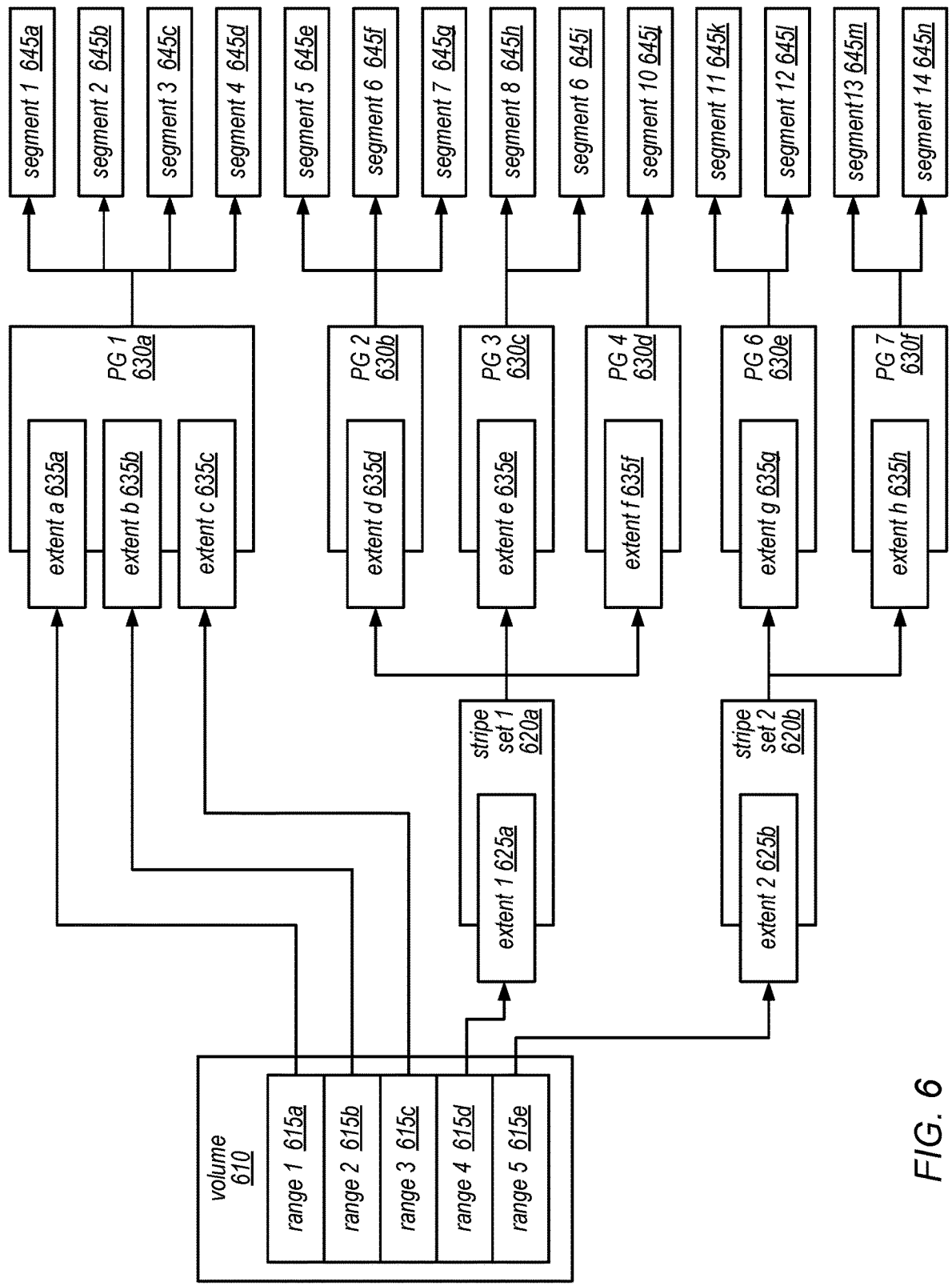
FIG. 6 is a logical block diagram illustrating an example configuration of a data volume, according to some embodiments.

FIG. 6 is a block diagram illustrating an example configuration of a database volume 610, according to one embodiment. Volume 610 may be a logical concept representing a highly durable unit of storage that a user/client/application of the storage system understands, in some embodiments. A volume may be stored or maintained in a distributed store that appears to the user/client/application as a single consistent ordered log of write operations to various user pages of a database. Each write operation may be encoded in a User Log Record (ULR), which represents a logical, ordered mutation to the contents of a single user page within the volume. As noted above, a ULR may also be referred to herein as a redo log record. Each ULR may include a unique identifier (e.g., a Logical Sequence Number (LSN)) assigned from a log sequence number space. Each ULR may be persisted to one or more synchronous segments in the log-structured store that form a Protection Group (PG) maintaining the partition of user data space (i.e. extent) to which the update indicate by the log record pertains in order to provide high durability and availability for the ULR. A volume may provide an LSN-type read/write interface for a variable-size contiguous range of bytes. In some embodiments, a volume may consist of multiple extents, each made durable through a protection group. In such embodiments, a volume may represent a unit of storage composed of a mutable contiguous sequence of Volume Extents. Reads and writes that are directed to a volume may be mapped into corresponding reads and writes to the constituent volume extents. In some embodiments, the size of a volume may be changed by adding or removing volume extents from the end of the volume.

In this example, data corresponding to each of various address ranges 615 (shown as address ranges 615a-615e) is stored as different segments 645 (shown as segments 645a-645n). A segment maybe a limited-durability unit of storage assigned to a single storage node, in some embodiments. Multiple segments may be implemented in a protection group to persist an extent. More specifically, a segment may provide limited best-effort durability (e.g., a persistent, but non-redundant single point of failure that is a storage node) for a specific fixed-size byte range of data. This data may in some cases be a mirror of user-addressable data, or it may be other data, such as volume metadata or erasure coded bits, in various embodiments. A given segment may live on exactly one storage node, in one embodiment. Within a storage node, multiple segments may live on each storage device, and each segment may be restricted to one storage device (e.g., a segment may not span across multiple storage devices). In some embodiments, a segment may not be required to occupy a contiguous region on an storage device; rather there may be an allocation map in each storage device describing the areas that are owned by each of the segments. As noted above, a protection group may consist of multiple segments spread across multiple storage nodes. In some embodiments, a segment may provide an LSN-type read/write interface for a fixed-size contiguous range of bytes (where the size is defined at creation). In some embodiments, each segment may be identified by a Segment UUID (e.g., a universally unique identifier of the segment). More specifically, data corresponding to each of various address ranges 615 may be organized into different extents (shown as extents 625a-625b, and extents 635a-635h), and various ones of these extents may be included in different protection groups 630 (shown as 630a-630f), with or without striping (such as that shown as stripe set 620a and stripe set 620b). In this example, protection group 1 illustrates the use of erasure coding. In this example, protection groups 2 and 3 and protection groups 6 and 6 represent mirrored data sets of each other, while protection group 4 represents a single-instance (non-redundant) data set. In this example, protection group 8 represents a multi-tier protection group that combines other protection groups (e.g., this may represent a multi-region protection group). In this example, stripe set 1 (620a) and stripe set 2 (620b) illustrates how extents (e.g., extents 625a and 625b) may be striped into a volume, in some embodiments.

More specifically, in this example, protection group 1 (630a) includes extents a-c (635a-635c), which include data from ranges 1-3 (615a-615c), respectively, and these extents are mapped to segments 1-4 (645a-645d). Protection group 2 (630b) includes extent d (635d), which includes data striped from range 4 (615d), and this extent is mapped to segments 5-7 (645e-945g). Similarly, protection group 3 (630c) includes extent e (635e), which includes data striped from range 4 (615d), and is mapped to segments 8-6 (645h-645i); and protection group 4 (630d) includes extent f (635f), which includes data striped from range 4 (615d), and is mapped to segment 10 (645j). In this example, protection group 6 (630e) includes extent g (635g), which includes data striped from range 5 (615e), and is mapped to segments 11-12 (645k-645l); and protection group 7 (630f) includes extent h (635h), which also includes data striped from range 5 (615e), and is mapped to segments 13-14 (645m-645n).

Please note that the striping, erasure coding, and other storage schemes for the database volume apply to the user data space of the database volume, not the log records pertaining to the volume. Log records are segmented across protection groups according to the partition of the volume maintained at the protection group. For example, log records indicating updates to the user data striped from range 5 maintained in PG 6, pertain to the user data in PG 6.

Figure 7:
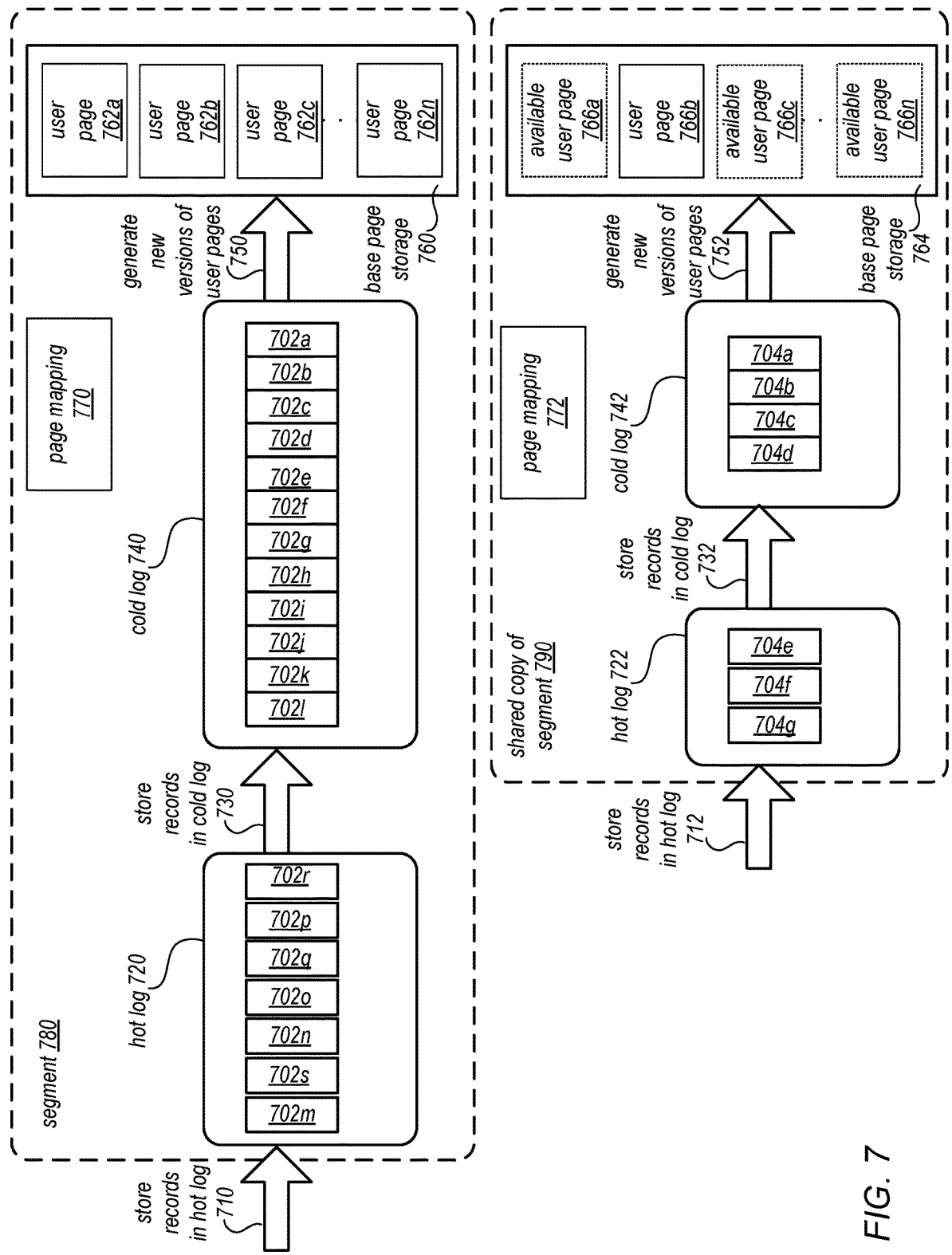
FIG. 7 is a logical block diagram illustrating an example segment and shared copy of a segment, according to some embodiments.

FIG. 7 is a logical block diagram illustrating an example segment (which may be a full type copy of another segment stored in another location or an original database) and shared copy of a segment, according to some embodiments. In some embodiments, a segment, such as segment 780, implement a hot log zone 720 to accept new writes from the client as they are received by the storage node. For example, writes may be received from a client as Delta User Log Records (DULRs), which specify a change to a user/data page in the form of a delta from the previous version of the page, and Absolute User Log Records (AULRs), which specify the contents of a complete user/data page, may be written completely into the log. Log records may be added to this zone in approximately the order they are received (e.g., they are not sorted by LSN) and they can span across log pages. The log records may be self-describing, e.g., they may contain an indication of their own size.

In some embodiments, the storage systems described herein may maintain various data structures, such as page mapping 770, in memory. For example, for each user page present in a segment, a user page table may store a bit indicating whether or not this user page is "cleared" (i.e., whether it includes all zeroes), the LSN of the latest log record from the cold log zone for the page, and an array/list of locations of all log records from the hot log zone for page. For each log record, the user page table may store the sector number, the offset of the log record within that sector, the number of sectors to read within that log page, the sector number of a second log page (if the log record spans log pages), and the number of sectors to read within that log page. In some embodiments, the user page table may also store the LSNs of every log record from the cold log zone and/or an array of sector numbers for the payload of the latest AULR if it is in the cold log zone.

In some embodiments of the storage systems described herein, an LSN index may be stored in memory. An LSN index may map LSNs to log pages within the cold log zone. Given that log records in cold log zone are sorted, it may be to include one entry per log page. However, in some embodiments, every non-obsolete LSN may be stored in the index and mapped to the corresponding sector numbers, offsets, and numbers of sectors for each log record.

In some embodiments of the storage systems described herein, a log page table may be stored in memory, and the log page table may be used during garbage collection of the cold log zone. For example, the log page table may identify which log records are obsolete (e.g., which log records can be garbage collected) and how much free space is available on each log page.

Figure 11:
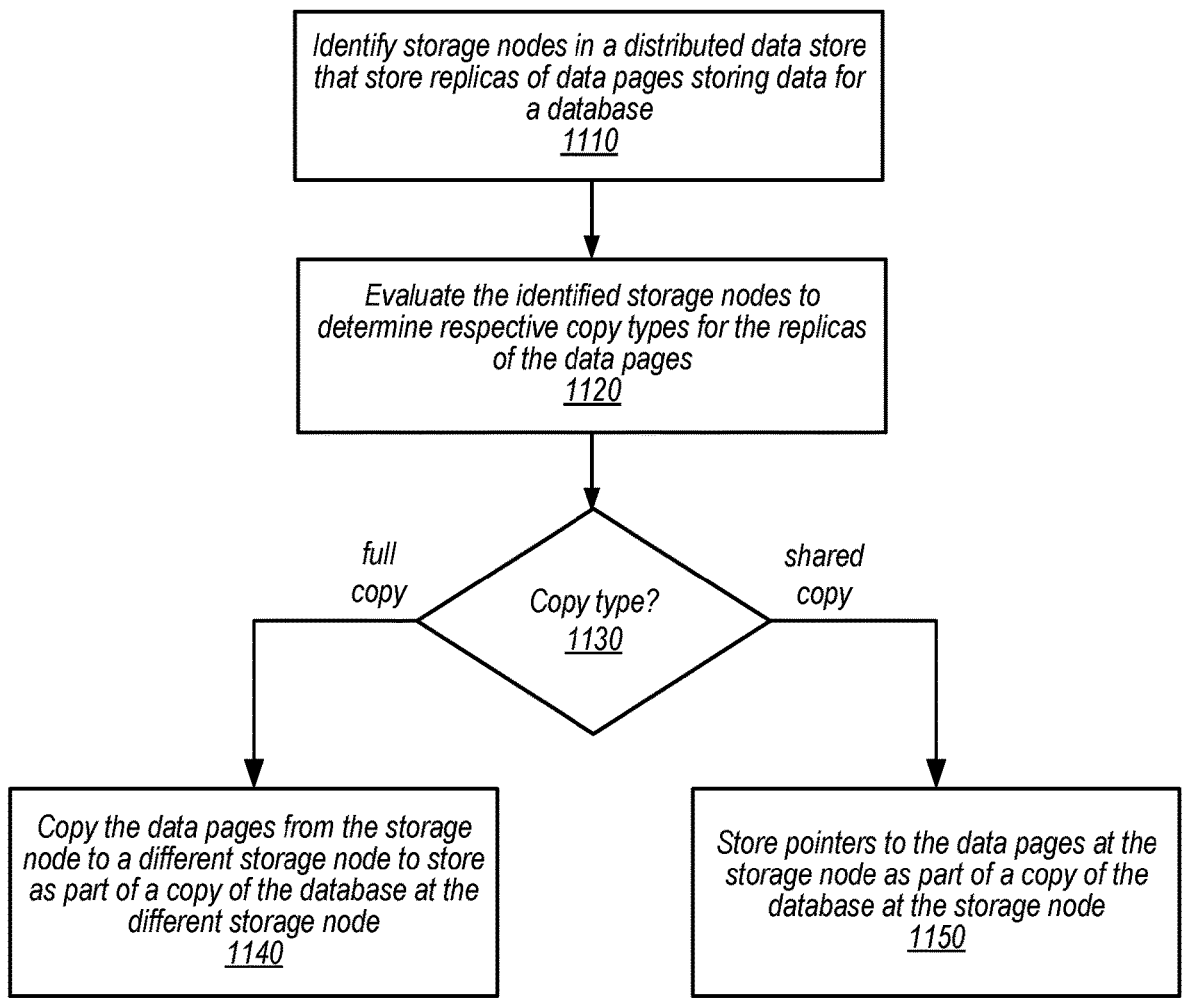
FIG. 11 is a high-level flowchart illustrating methods and techniques to determine a copy type for replicas of data pages of a database in a distributed data store, according to some embodiments.

Segment 780 may be a segment stored for an original database or a full copy of a segment created for a copy of a database (as discussed below with regard to FIGS. 8-9, and 11). As noted above log records received at a storage node may be stored 710 in a hot log zone 720. Log records may be received out of order, appended to the hot log zone 720 as they are received. For example, in FIG. 7 the ordering of log records proceeds from record 702*r*, then 702*p*, 702*q*, 702*o*, 702*n*, 702*s*, and finally 702*m* (contrary to a sequential ordering which might start with 702*m* to 702*s*). Log records sent to a storage system, such as described above in FIG. 5, may be sent asynchronously, leading to log records received out of order at hot log 720.

As discussed above, log records may be moved from the hot log 720 to store the log records 730 in the cold log 740. The cold log zone may be populated by copying log records from the hot log zone. In some embodiments, only log records whose LSN is less than or equal to some threshold LSN value may be eligible to be copied to the cold log zone. When moving log records from the hot log zone to the cold log zone, some log records (such as many change log records) may not need to be copied because they are no longer necessary. In addition, some additional coalescing of log records to generate new versions 750 of user pages 762 may be performed at this point (e.g., either to overwrite or store a new version of a user page in a separate location as discussed below with regard to FIG. 12). For example, if user page is not shared with any other copies of the database segment, such as shared copy of the segment 790, then the user page may be overwritten in base page storage 760. In some embodiments, log records stored in data blocks grouped together in log pages. In some embodiments, once a given hot zone page or data block has been completely written to cold log 740 and is no longer the newest hot zone data block, and all log records on the hot zone data block have been successfully copied to the cold log zone, the hot zone data block may be freed and reused.

Cold log zone 740 may, in various embodiments, maintain log records for a log-structured data store, such as log records 702*a*, 702*b*, 702*c*, 702*d*, 702*e*, 702*f*, 702*g*, 702*h*, 702*i*, 702*j*, 702*k*, and 702*l* respectively. The log records, of which many various descriptions presented above, may be AULRs, DULRs, or any other type of log record for the example storage system described above, or any other log-structured data store. These log records may be linked to or associated with a user page 762. For example, a log record may describe an update/change/modification for some portion, or all, of the user page, such as change relative to a previous record or version of the data page (e.g., a DULR). In some embodiments, log records may be stored sequentially in data blocks or pages. Thus, the latest LSN in the ordering of log records maintained in a data block may indicate that all log records in the log page are prior to the latest LSN.

Base page storage 760, may maintain entries or versions of user pages 762*a*, 762*b*, 762*c* through 762*n*. For example, each entry in base page storage 760 may maintain a replica or copy of the respective user page. In some embodiments, each entry may be compressed, encrypted, or otherwise modified. Other data, such as other log records linked to the data page, may also be stored with the data page in the entry for the data page in backstop 760. Page mapping 770 may identify the locations of user pages, so that when a request to access a user page 762 is received (e.g., in order to read a user page 762), page mapping 770 can be used to access the page.

Shared copy of the segment 790 may be stored at the same storage node, and in at least some embodiments, on the same storage device as the segment(s) with which it shares data pages (e.g., multiple copies of a database may be stored together as discussed below with regard to FIG. 9). Once a copy of a database is created, the various numbers of ranges and extents may be created as segment copies (e.g., in protection groups as discussed below with regard to FIG. 8). As illustrated in FIG. 7, a shared copy of a segment may store data for use in a manner similar to segment 780, including storing 712 received log records for the copy of the database in the hot log portion 722, moving the log records 732 to be stored in cold log portion 742, and then generating new versions of user pages 752 (e.g., when updates modify a user page as discussed above with regard to FIG. 1 or below with regard to FIG. 10). Shared copy of segment 790 may include page mapping information which may identify pages in base page storage 764 or in another base page storage, such as base page storage 760. As shared copy of segment 790 shares some data pages with segment 780, base page storage may have available user pages, such as available user pages 766a, 766c, and 766n, while maintaining a smaller number of stored user pages, such as user page 766b.

As discussed above, different types of database copies may be created. While some database copies may be shared type copies that share database pages with another database, other copies may be a full or complete copy of the database. Automated and intelligent selection of which storage nodes store shared type copies or full type copies may be made (e.g., according to various techniques discussed below with regard to FIG. 11). FIG. 8 is a logical block diagram illustrating a protection group for a segment of a database copy, according to some embodiments.

Database engine 820 may implement a client-side driver, such as client-side driver 840, to store redo log record(s) 831 describing changes to data pages made in a copy created of a database stored in a protection group 830, which may be replicated amongst copies according to peer-to-peer synchronization 870 (e.g., a gossip-based redo log record replication technique). As discussed above with regard to FIG. 6, data pages for the database may be stored in a volume divided into ranges, which may include one or more extents. An extent may be stored in a protection group, such as protection group 830 for an extent of a database copy. Protection group 830 may include multiple storage nodes, such as storage nodes 835a, 835b, 835c, 835d and 835e, which may each store a copy of the extent created when the copy of the database is created, in some embodiments.

The types of copies created may be determined by copy management 416, in one embodiment. For example, when a request to create a copy of a database is received, the storage nodes that store the source database for the new copy (e.g., a database or copy of a database) may be identified and an evaluation of the storage nodes performed based on metrics collected from or reported by the storage nodes with respect to criteria, thresholds, or other conditions to determine whether a full copy or shared copy should be created, in some embodiments. Available storage capacity, for instance, may indicate that the storage capacity of the storage node is unable to store a copy of the database at the storage node (e.g., by comparing available storage capacity with a threshold available value), in one embodiment. In one embodiment, network traffic, processor utilization, I/O bandwidth utilization, or other utilization metrics may be compared with a heat threshold, to determine whether the burden of processing requests to access the copy can be maintained on the storage node. In some embodiments, copy type may be determined based on a durability model (e.g., requiring at least 2 full copies out of 6 database copies made). Thus, a protection group for an extent, such as protection group 830, may include some storage nodes that store shared copies, like shared copy 838a, 838b, 838c, and 838e, which are stored together along with other copies of a database (e.g., on a same storage device), and some storage nodes that store a full copy, such as full copy 838d, which may not store any other copies of the database, in some embodiments.

As discussed above with regard to FIG. 4, in some embodiments, a backup of a database may be stored in another data store, such as backup storage system 850 (which may implement its own durability and availability polices, such as the number and location of copies of stored data to maintain). Backups of copies of databases may be created and maintained similar to the copies of the databases maintained in storage service 310 as both copies and the original source database may be maintained in the same backup storage system 850. For instance, a backup of a copy may store the same data pages stored in the copy of the database (e.g., data pages that have been modified from the source database). In this way, the same storage utilization and copy creation costs savings may be achieved as discussed above with regard to FIG. 1, in some embodiments. For example, log records(s) 851 describing the changes to the copy of the database may be copied from storage nodes (e.g., by backup agents 418 in FIG. 4) to be stored as part of an archived log 854. Snapshots or copies of base page storage 856 for an extent (such as discussed above with regard to FIG. 7) may be stored along with page mapping 857, which may include pointers to pages stored shared copy of base page storage 856 or other base page storage 858 (which may be backups for other copies or the original data database).

Figure 8:
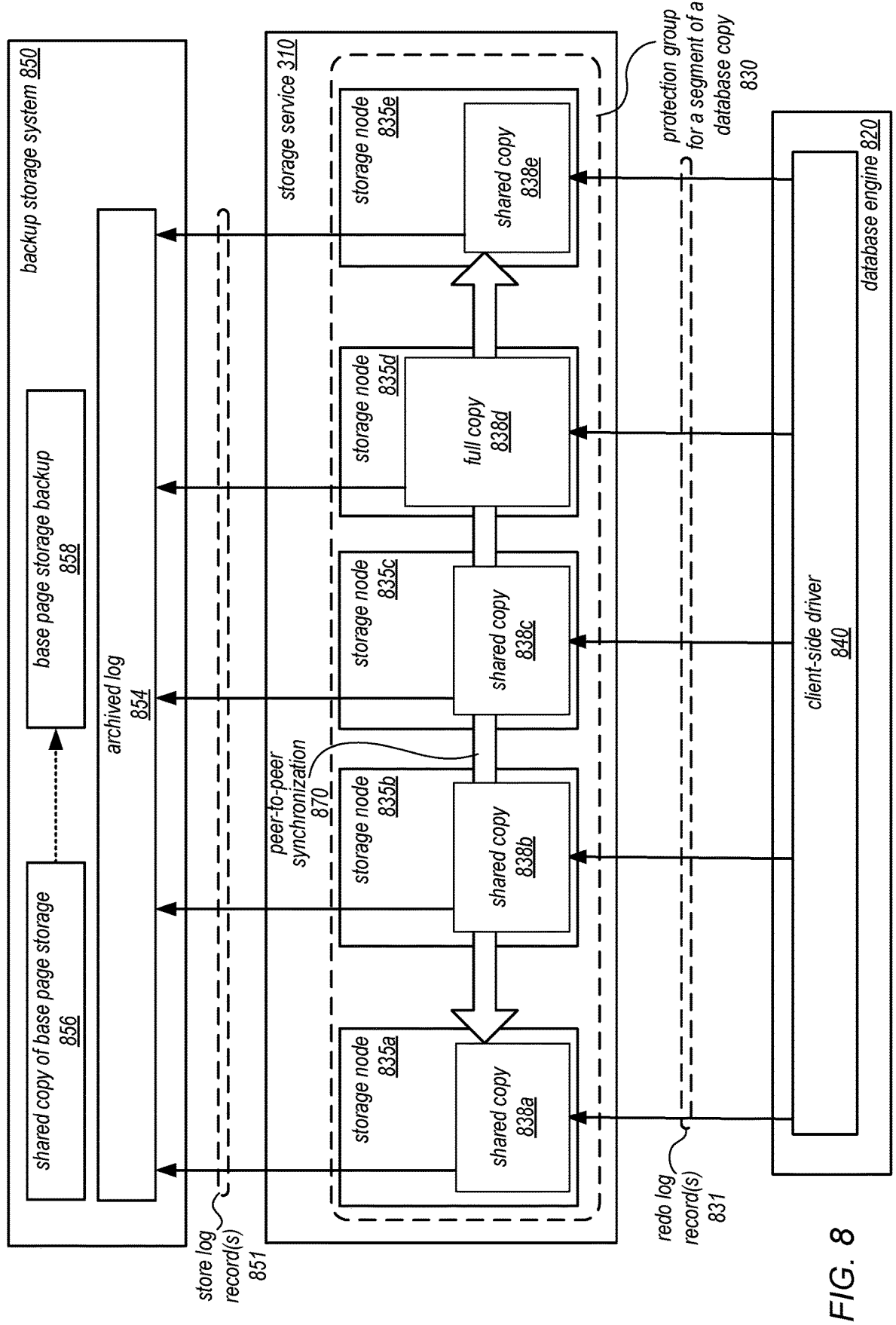
FIG. 8 is a logical block diagram illustrating a protection group for a segment of a database copy, according to some embodiments.

Please note that the number of copies or storage nodes that make up a protection group for a database illustrated in FIG. 8 and discussed above is not intended to be limiting. Different numbers of copies or storage nodes (e.g., 4, 6, 20) could implement similar techniques for sharing data pages for database copies.

In at least some embodiments, multiple copies of databases may be created. For example, one copy may be created of database in order to apply different schema changes to the copy. A second copy may then be made of the first copy, in order to perform development or testing of the changes with respect to a particular type of client application. Thus, various combinations of database copies may be made, in different scenarios. The techniques discussed above and below for creating database copies may be applied in such scenarios, including the example of making a second copy of a first copy. FIG. 9 is logical block diagram illustrating multiple copies of a database that share data pages, according to some embodiments.

Figure 9:
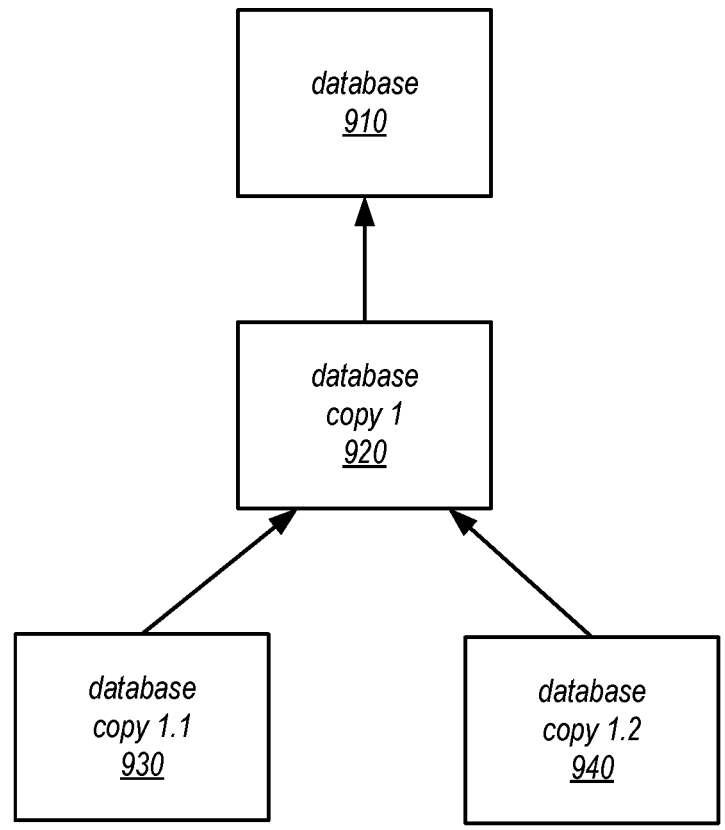
FIG. 9 is logical block diagram illustrating multiple copies of a database that share data pages, according to some embodiments.
Figure 9:
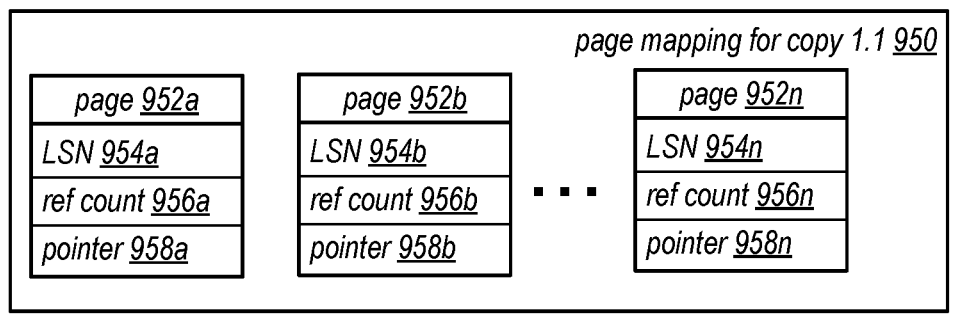
Figure 9:
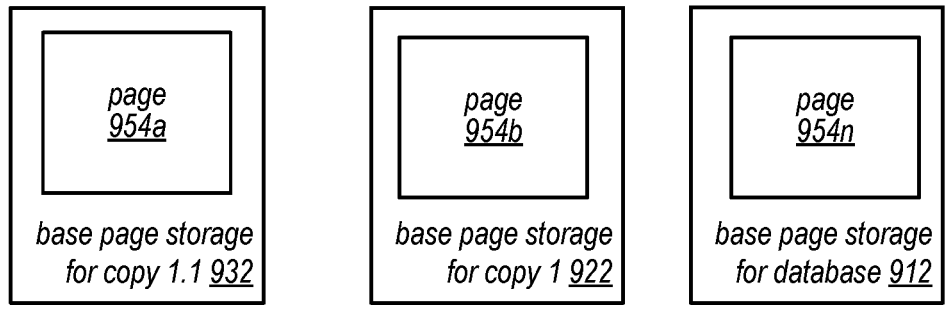

As illustrated in FIG. 9, database 910 may be the source or parent database from which various copies are made. Database copy 920 may be made (e.g., to add new data to the database) from database 910. In order to test the changes made in database copy 920 in different application environments, database copy 930 and database copy 940 may be made. Together these copies may be a database copy tree (or clone tree), in some embodiments. As each database copy may be made by sharing database pages, as discussed above, the same data page may be shared amongst multiple copies. For example, database copy 920 may share a data page with database 910. If that data page is not changed for database copy 920 when database copy 930 and database copy 940 are made, then database copy 930 and 940 may also share the same data page stored as part of database 910.

For example, page mapping 950 for database copy 930 may store page mappings for the pages of database copy 930, such as mappings for pages 952a, 952b, 952n, and so on. Each mapping 952 may include indication of the version of the data page, such as an LSN (e.g., LSNs 954a, 954b, and 954n). The LSN 954 may indicate what changes are included in the stored data page (by indicating the point in the log record sequence for which the current version includes changes described in log records with lesser LSN values), in one embodiment. Page mappings 952 may also include a reference count for a page, such as ref counts 956a, 956b, and 956n. Reference counts 954 may indicate whether a data page is relied upon or referenced by a copy of databases, in some embodiments. In one embodiment, separate reference counts may be maintained for each database. For example, database 910 may maintain a reference count of one for data pages that it stores, database copy 920 page mapping may maintain a reference count of two for a data page pointed to by database copy 920 (as both copy 920 and database 910 point to the shared page), and database copy 930 page mapping may maintain a reference count of three for a data page pointed to by database copy 930 in database 910 (as copy 930, copy 920 and database 910) point to the page. As discussed below with regard to FIG. 12, when a request to modify a data page is received, the sum of all reference count values for the copies in a copy tree (e.g., database 910, copies 920, 930, and 940) may be evaluated, if equal to 1, then only 1 database or copy refers to that page and the page can be overwritten. Page mapping 952 may also maintain pointers, such as pointers 958*a*, 958*b*, and 958*n*, to pages stored in base page storage (as discussed above in FIG. 7). For example, pointer 958*a* may point to page 954*a* stored in the base page storage 932 for database copy 930, while pointer 958*b* may point to page 954*b* stored in base page storage 922 for copy 920, and pointer 958*n* may point to base page storage 912 for database 910. As updates are made to data pages, the LSN values 954, the ref count values 956, and pointer values 958 may be updated correspondingly.

Note that the discussion and examples given above with regard to FIG. 9 are not intended to be limiting. Different copy trees, for example, can have different numbers of database copies or dependencies between copies. Similarly the numbers or location of shared pages can be different or can change. If, for instance, database copy 920 had changed a data page such that a data page storing the change is stored as part of database copy 920, then database copy 930 may include a pointer to the data page stored as part of database copy 920 (e.g., and not the data page stored for database 910).

Figure 10:
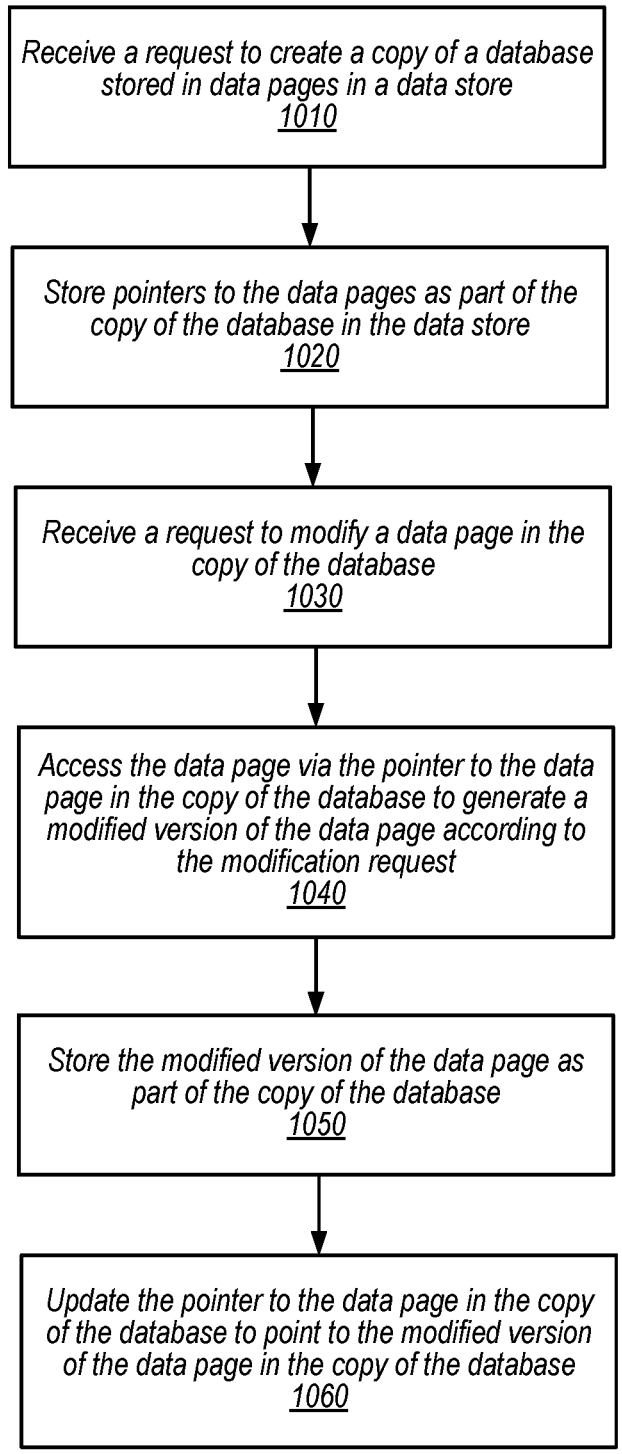
FIG. 10 is a high-level flowchart illustrating methods and techniques to implement shared pages for database copies, according to some embodiments.

The storage service and database service discussed in FIGS. 2 through 9 provide examples of a data store that shares data pages for database copies. However, various other types of storage systems and database systems may implement shared pages for database copies. FIG. 10 is a high-level flowchart illustrating methods and techniques to implement shared pages for database copies, according to some embodiments. Various components, systems, or devices, described above may perform the techniques described below with respect to FIGS. 10-13 as well as different database systems and data stores.

As indicated at 1010, a request may be received to create a copy of database that is stored in data pages in a data store, in various embodiments. For example, the request may be received according to an API call, or other programmatic invocation, a command line interface, graphical user interface or console, or any other interface, in one embodiment. The request may identify the database, and may, in some embodiments, identify a point in time for the database which is being copied (e.g., by including a timestamp, sequence number or identifier, etc.). The data pages in the database may be stored in one or multiple locations, in some embodiments. A group of replicas of data pages, such as a protection group or quorum set of replicas of data pages may be implemented, in some embodiments, to store the data pages, as discussed above.

As indicated at 1020, in response to the request to create the copy of the database, pointers to the data pages may be stored as part of the copy of the database in the data store, in various embodiments. For example, a page table or other mapping information (e.g., an index structure such as a B tree) may be generated that includes pointers to the location of data pages in the data store (e.g., block addresses, paths, or other ways of identifying data within a storage device). As discussed below with regard to FIG. 11 and above with regard to FIGS. 7-9, in some embodiments the data pages may be replicated in different locations, so that a determination may be made for each replica of the data pages whether a reference copy may be generated, that includes pointers to the data pages or a full copy of the data pages may be created. Other operations may be performed as part of the creation of the copy. For example, metadata, such as page tables, index structures, compression schemes (e.g., LZO, run-length encoding, etc.), encryption schemes (e.g., encryption algorithms and keys to generate encrypted versions of data), and/or data dictionaries may be populated with other information, such as reference counts, data statistics, or information for processing access requests with respect to the copy of the database. In embodiments that implement log-structured storage, log pages or other log space may be allocated and/or formatted to begin receiving and storing log records.

Once the copy of the database is created, both the copy and the original or source database may process access requests (e.g., requests to read or write data pages of the respective databases), in various embodiments. For example, as indicated at 1030, a request may be received to modify a data page in the copy of the database, in various embodiments. A new database engine or management system may be implemented as part of creating the copy of the database to handle access requests to the database. For example, SQL statements, such as INSERT, UPDATE, DELETE, or MERGE, may be sent to and processed by the new database engine that initiate or cause the modification of a data page in the copy of the database (e.g., by submitting a request to write or otherwise change a data page to a storage engine, such as the client-side storage driver that communicates with a remote data store or a local storage engine, like InnoDB).

As indicated at 1040, the data page may be accessed via the pointer to the data page in the copy of the database to generate a modified version of the data page according to the modification request, in some embodiments. For instance, the page table or index structure may be read to find the pointer to the data page, in one embodiment. The data page pointer may then be used to issue a command to read the data page at the location identified by the pointer, in one embodiment. Once read, the data page may be modified according to the modification request (e.g., change data values in a record, add or delete columns as part of a schema change, delete records, etc.), in some embodiments. As indicated at 1050, the modified version of the data page may be stored as part of the copy of the database, in some embodiments. For example, one of a group allocated or pre-formatted data pages that are marked or otherwise identified as available to store a data page for the copy of the database may be selected and written to store the modified version of the data page. In at least some embodiments, the modified version of the data page may be stored according to the same encryption scheme and/or compression scheme as the source database (e.g., by using the same encryption key to encrypt the modified version of the data page). As indicated at 1060, the pointer to the data page in the copy of the data may be updated to point to the modified version of the data page in the copy of the database, in various embodiments. For example, the page table, index structure, or other data that maps pointers for data pages of the copy of the database may be overwritten with the value of the address, path, or other location identifier for the selected page that stores the modified version of the data page.

As noted above with regard to FIGS. 7-9, distributed data stores may be implemented to replicate a database across multiple locations (e.g., different storage hosts, storage nodes, or storage devices) to provide increase durability and availability of the data in a database, in some embodiments. In some scenarios, the capabilities of different storage locations (e.g., due to different hardware providing different processing, I/O, or storage capacity) or the utilization of different storage locations (e.g., due to multi-tenant utilization of storage hosts) may affect whether it is efficient to implement shared pages for database copies. FIG. 11 is a high-level flowchart illustrating methods and techniques to determine a copy type for replicas of data pages of a database in a distributed data store, according to some embodiments.

As indicated at 1110, storage nodes in a distributed data store that store replicas of data pages storing data for a database may be identified, in various embodiments. For example, a mapping or listing, such as protection group member list or quorum group member list of storage nodes for part or all of the data in a database (e.g., an extent, range or volume), may be evaluated to identify the storage nodes that store replicas of the data pages for the database (e.g., retrieving host identifiers, network addresses, etc.). As indicated at 1120, an evaluation of the identified storage nodes may be performed to determine respective copy types for the replicas of the data pages, in some embodiments. For example, a ping or other request for metrics may be sent to the storage nodes, in one embodiment. In another embodiment, a sweeper or other polling mechanism may poll storage nodes for metrics. The metrics received from storage nodes may include utilization metrics (e.g., processor capacity utilized, storage capacity utilized/available, network traffic load, etc.), health metrics (e.g., performance tests, warnings, or failure condition indicators), or any other information about the storage node that may indicate the capability of the storage node to host a full or shared copy of database, in some embodiments. The metrics may be evaluated with respect to criteria, thresholds, or other conditions to determine whether a full copy or shared copy should be created, in some embodiments. For example, available storage capacity may indicate that the storage capacity of the storage node is unable to store a copy of the database at the storage node (e.g., by comparing available storage capacity with a threshold available value), in one embodiment. In one embodiment, network traffic, processor utilization, I/O bandwidth utilization, or other utilization metric may be compared with a heat threshold, to determine whether the burden of processing requests to access the copy can be maintained on the storage node. In some embodiments, copy type may be determined based on a durability model (e.g., requiring at least 2 full copies out of 6 database copies made). For example, the identified storage nodes may be evaluated to determine which 2 storage nodes should not store a copy of the database, but instead should be used to create a full copy at a different storage node.

As indicated by the full copy type exit from 1130, the data pages from the storage node may be copied to a different storage node (e.g., not an identified storage node at 1110) to store as part of the copy of the database at the different storage node, as indicated at 1140. For example, a background mechanism or agent may perform the copy of the data pages from the storage node to the destination/different storage node. In some embodiments, the copy of data pages may be made from a back of the data pages (e.g., that are the same as the data pages at the storage node) to the different storage node.

As indicated by the shared copy type exit from 1130, pointers to the data pages at the storage node may be stored as part of a copy of the database at the storage node, as indicated at 1250. For example, a background mechanism or agent performing the copy creation request may generate and store the pointers to the data pages. In some embodiments, a database or storage engine for the source database may write the pointers to the copy of the database at the storage node.

Figure 12:
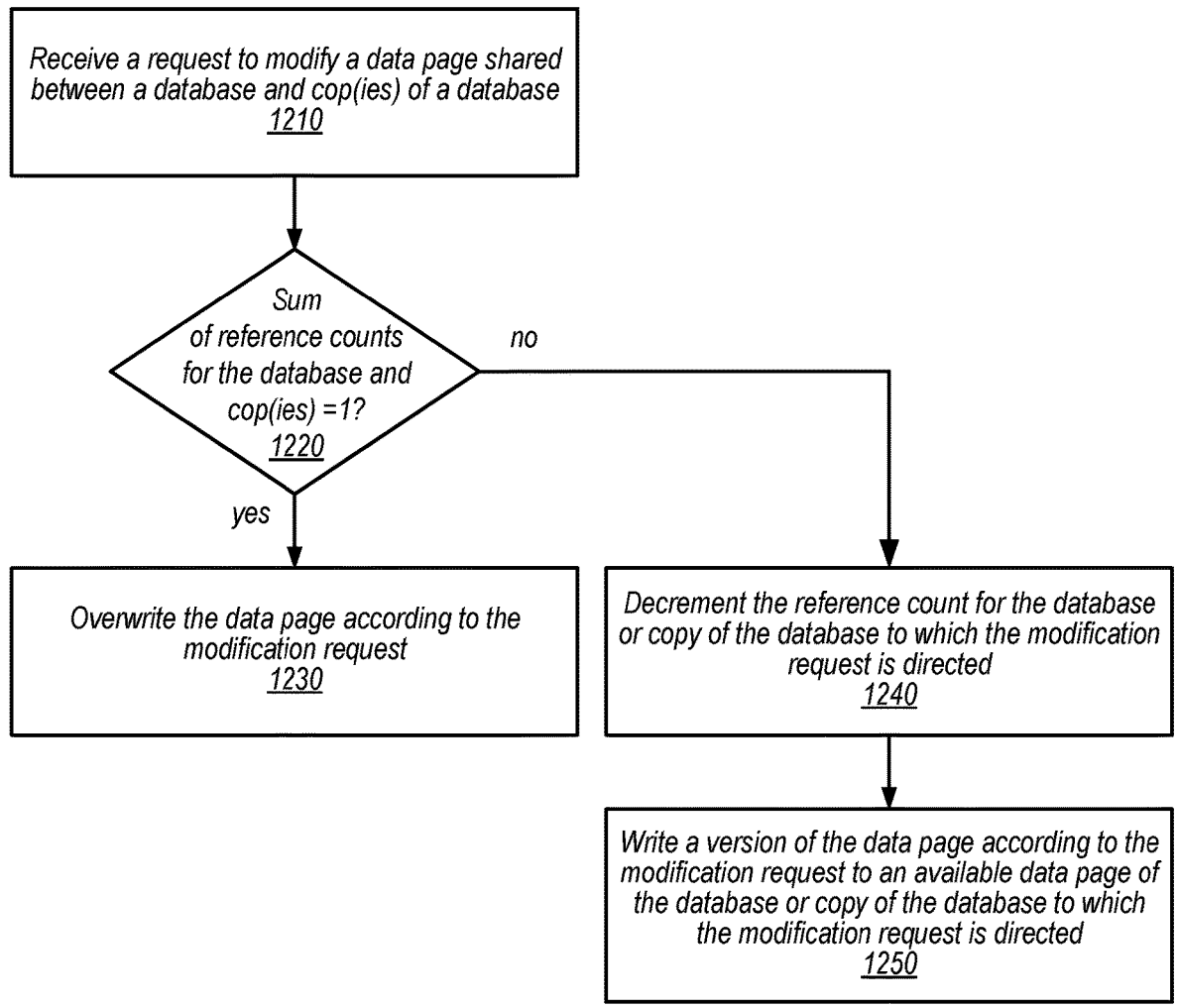
FIG. 12 is a high-level flowchart illustrating methods and techniques to process a request to modify a shared data page, according to some embodiments.

FIG. 12 is a high-level flowchart illustrating methods and techniques to process a request to modify a shared data page, according to some embodiments. As indicated at 1210, a request may be received to modify a data page shared between a database and one or more copies of a database (e.g., as shared according to the techniques discussed above with regard to FIGS. 10 and 11). A modification request may performed or received as a result of a SQL statements (e.g., such as INSERT, UPDATE, DELETE, or MERGE), other query language, API, or other programmatic instruction to change a data page, in various embodiments (e.g., the request may be received by a database engine that initiates or cause the modification of a data page in the copy of the database by submitting a request to write or otherwise change a data page to a storage engine, such as the client-side storage driver that communicates with a remote data store or a local storage engine, like InnoDB).

As both the database and copies of the database may receive requests to modify a data page, a determination may be made as to whether a data page can be overwritten because no other copies of the database depend on the data page, in various embodiments. For example, reference counts may be maintained for the database and each copy of the database (e.g., separately in memory) as discussed above with regard to FIG. 9. The reference count values indicate whether another database or copy refers to that page in order to store the database. Thus, as indicated at 1220, a sum of the reference counts for the database and cop(ies) may be evaluated. If the sum of reference counts equals one, then only the database (or copy) that received the request still utilizes the current version of the data page that is stored. As indicated by the positive exit from 1220, in the case where the sum of reference counts equals one, the data page may be overwritten according to the modification request, as indicated at 1230 (with the modified value), in various embodiments.

If the sum of reference counts does not equal one, then the reference count for the database or copy of the database to which the modification request is directed may be decremented, as indicated at 1240, in various embodiments (e.g., reduced by a value of one). A version of the data page determined according to the modification request may be written to an available data page of the database or copy of the database to which the modification request is directed, as indicated at 1250, in some embodiments. For example, a list or mapping of available data pages may be maintained and one selected to store the new version of the data page, in some embodiments.

Figure 13:
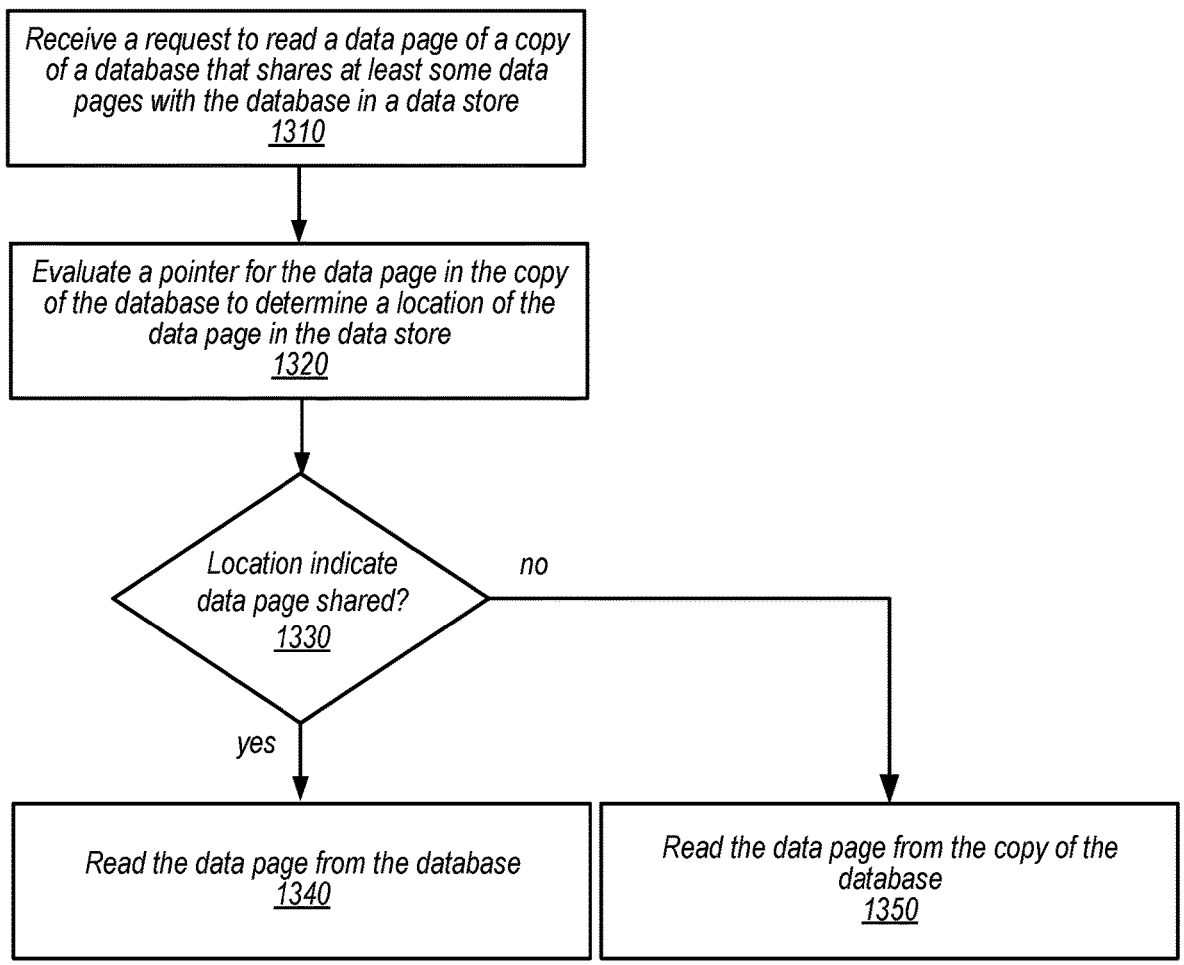
FIG. 13 is a high-level flowchart illustrating methods and techniques to process a request to read a shared data page, according to some embodiments.

FIG. 13 is a high-level flowchart illustrating methods and techniques to process a request to read a shared data page, according to some embodiments. As indicated at 1310, a request may be received to read a data page of a copy of a database that shares at least some data pages with the database in a data store, in various embodiments. For example, a statement in a query language like SQL may be received with requests for data (e.g., a SELECT statement), or an API command or other request specifying data to retrieve may be received, in some embodiments. As indicated at 1320, a pointer for the data page may be evaluated in the copy of the database to determine a location of the data page in the data store, in some embodiments. The pointer may point to a location that is part of the database (or another copy of the database), indicating that the location is shared. As indicated by the positive exit from 1330, if the data page is shared, then the data page may be read from the database (or other copy of the database), as indicated at 1340. If the location indicates that the data page is not shared, then the data page may be read from the copy of the database, as indicated at 1350 (which may indicate that the data page has already been modified from an earlier version shared with the database), in some embodiments.

The methods described herein may in various embodiments be implemented by any combination of hardware and software. For example, in one embodiment, the methods may be implemented by a computer system (e.g., a computer system as in FIG. 14) that includes one or more processors executing program instructions stored on a computer-readable storage medium coupled to the processors. The program instructions may implement the functionality described herein (e.g., the functionality of various servers and other components that implement the database services/systems and/or storage services/systems described herein). The various methods as illustrated in the figures and described herein represent example embodiments of methods. The order of any method may be changed, and various elements may be added, reordered, combined, omitted, modified, etc.

Figure 14:
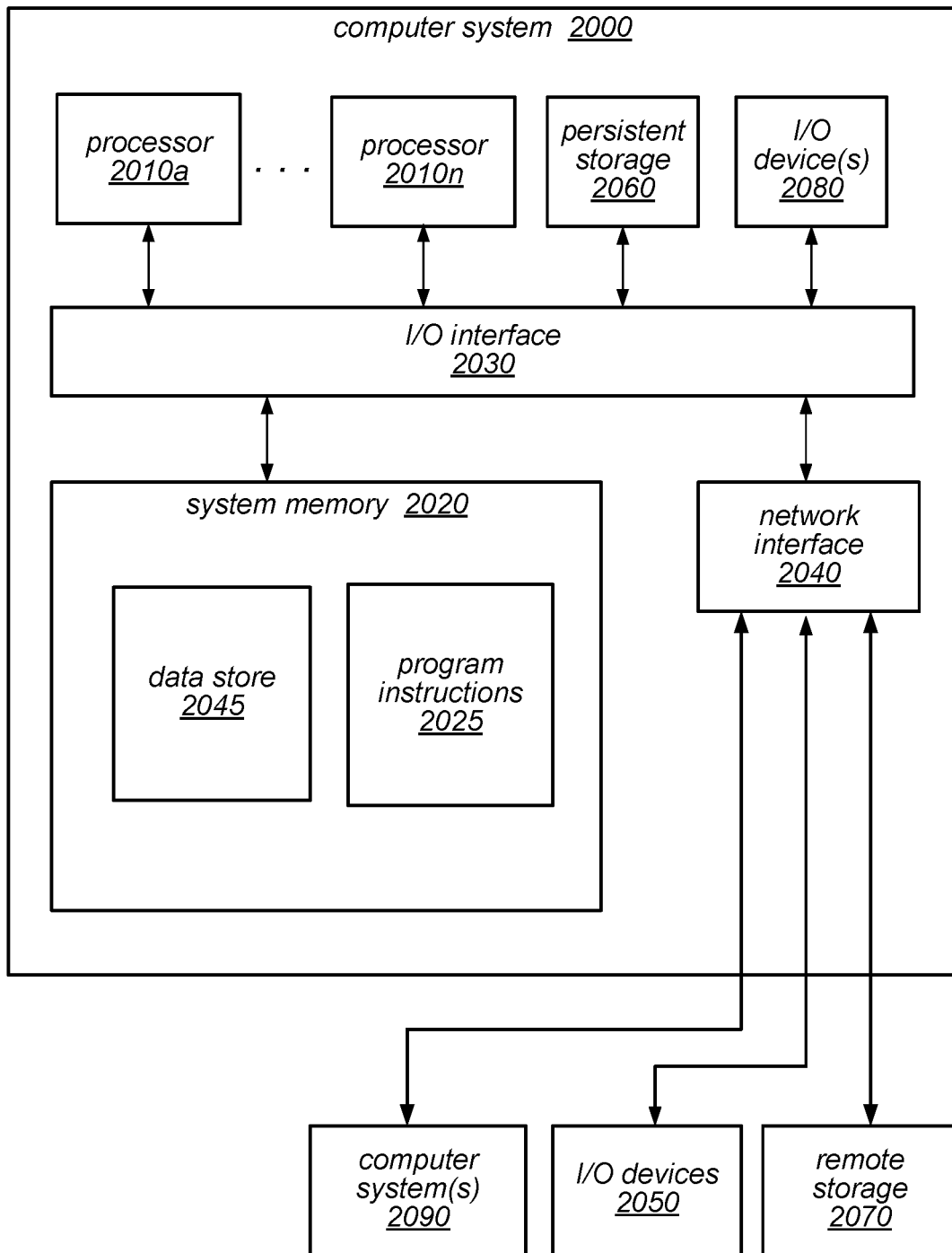
FIG. 14 is an example computer system, according to various embodiments.

FIG. 14 is a block diagram illustrating a computer system according to various embodiments, as well as various other systems, components, services or devices described above. For example, computer system 2000 may implement a database engine head node of a database tier, or one of a plurality of storage nodes of a separate distributed storage system that stores databases and associated metadata on behalf of clients of the database tier, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the database systems described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that can store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a database engine head node of a database tier, or one of a plurality of storage nodes, backup nodes, or restore nodes of a separate distributed storage system that stores databases and associated metadata on behalf of clients of the database tier, in different embodiments. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be implemented as described herein. For example, the information described herein as being stored by the database tier (e.g., on a database engine head node), such as a transaction log, an undo log, cached page data, or other information used in performing the functions of the database tiers described herein may be stored in data store 2045 or in another portion of system memory 2020 on one or more nodes, in persistent storage 2060, and/or on one or more remote storage devices 2070, at different times and in various embodiments. Similarly, the information described herein as being stored by the storage tier (e.g., redo log records, coalesced data pages, and/or other information used in performing the functions of the distributed storage systems described herein) may be stored in data store 2045 or in another portion of system memory 2020 on one or more nodes, in persistent storage 2060, and/or on one or more remote storage devices 2070, at different times and in various embodiments. In general, system memory 2020 (e.g., data store 2045 within system memory 2020), persistent storage 2060, and/or remote storage 2070 may store data blocks, replicas of data blocks, metadata associated with data blocks and/or their state, database configuration information, and/or any other information usable in implementing the methods and techniques described herein.

In one embodiment, I/O interface 2030 may coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems 2090 (which may implement one or more storage system server nodes, database engine head nodes, and/or clients of the database systems described herein), for example. In addition, network interface 2040 may allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 14 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a database engine head node within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
    a memory to store program instructions which, when performed by at least one processor, cause the at least one processor to perform a method to at least:
    receive a request to create a first copy of a database, wherein data for the database is stored in a plurality of data pages in a data store;
    in response to the receipt of the request to create the first copy, store pointers to the data pages of the database in the data store, wherein the pointers are stored as part of the first copy in the data store;
    in response to receipt of a request to modify a first data page of the first copy;
    access the first data page of the database via a pointer to the first data page of the database, the pointer to the first data page of the database stored as part of the first copy;
    generate a modified version of the first data page of the database according to the modification request;
    store the modified version of the first data page as part of the first copy in the data store;
    update the pointer to the first data page to point to the modified version of the first data page stored as part of the first copy and store the updated pointer as part of the first copy; and
    wherein the database is available to process access requests while the access, the generate, the store, and the update are performed in response to the request to modify the first data page.

2. The system of claim 1, wherein the request to create the first copy of a database is received via an Application Programming Interface (API).

3. The system of claim 1, wherein the method further includes: receive a request to read a second data page of the first copy; and
    read the second data page in the data store via a pointer to the second data page in the first copy.

4. The system of claim 1, wherein the database is managed by a network-based database service, wherein the data store is a network-based storage service, wherein the data pages are stored at a plurality of storage nodes, wherein the modification to the first data page is described in a log record sent from the database service to the storage service, and wherein to generate the modified version of the first data page, the log record is applied to the first data page.

5. A method, comprising:
    receiving a request to create a first copy of a database, wherein data for the database is stored i in a plurality of data pages in a data store;
    in response to receiving the request to create the first copy, storing pointers to the data pages of the database in the data store, wherein the pointers are stored as part of the first copy in the data store;
    in response to receiving a request to modify a first data page of the first copy:
    accessing the first data page of the database via a pointer to the first data page, wherein the pointer to the first data page is stored as part of the first copy, to generate a modified version of the first data page according to the modification request;
    storing the modified version of the first data page as part of the first copy in the data store; and
    updating the pointer to the first data page to point to the modified version of the first data page, and storing the updated pointer as part of the first copy.

6. The method of claim 5, wherein the data pages are replicated across a plurality of storage nodes implemented as part of the data store, wherein the storing the pointers to the data pages in the data store as part of the first copy in the data store stores the pointers in a first storage node of the storage nodes, and wherein the method further comprises copying the data pages to a second storage node implemented in the data store that is not included in the plurality of storage nodes that store the data pages.

7. The method of claim 6,
    wherein the method further comprises evaluating a third storage node included in the plurality of storage nodes to determine that a copy type of the first copy for the data pages stored at the third storage node is a full copy type; and
    wherein the copying the data pages to the second storage node comprises copying the pages from the third storage node to the second storage node to store as a full copy of the data pages.

8. The method of claim 7, wherein evaluating the third storage node comprises evaluating storage capacity of the third storage node to store a shared type copy of the database.

9. The method of claim 5, further comprising:
    receiving a request to modify a second data page of the database;
    determining that the first copy shares the second data page with the database; and
    storing a modified version of the second data page in a different location in the data store to retain the second data page for the first copy.

10. The method of claim 5, further comprising storing pointers to copies of the data pages stored in a backup storage system as part of a backup copy for the database in order to generate a backup copy for the first copy of the database.

11. The method of claim 5, further comprising:
    receiving a request to create a second copy of the first copy of the database; and
    in response to receiving the request to create the second copy, storing the pointers in the first copy in the data store as part of the second copy in the data store, wherein the pointers include the updated pointer to the modified version of the first data page stored as part of the first copy.

12. The method of claim 11, further comprising:
    receiving a request to read a second data page of the second copy; and reading the second data page in the data store via a pointer to the second data page in the second copy, wherein the second data page is stored as part of the database in the data store.

13. The method of claim 5, wherein the request to create the first copy of a database is received via an Application Programming Interface (API).

14. A non-transitory, computer-readable storage medium, storing program instructions that when executed by one or more computing devices cause the one or more computing devices to implement:
  receiving a request to create a first copy of a database, wherein data for the database is stored in a plurality of data pages in a data store;
  in response to receiving the request to create the first copy, storing pointers to the data pages of the database in the data store, wherein the pointers are stored as part of the first copy in the data store;
  in response to receiving a request to modify a first data page of the first copy;
  accessing the first data page of the database via a pointer to the first data page, the pointer to the first data page stored as part of the first copy, to generate a modified version of the first data page according to the modification request;
  storing the modified version of the first data page as part of the first copy in the data store; and
  updating the pointer to the first data page to point to the modified version of the first data page, and storing the updated pointer as part of the first copy.

15. The non-transitory, computer-readable storage medium of claim 14, wherein the data pages of the database are stored according to an encryption scheme, and wherein, in storing the modified version of the first data page as part of the first copy in the data store, the program instructions cause the one or more computing devices to implement encrypting the modified version of the data page according to the encryption scheme.

16. The non-transitory, computer-readable storage medium of claim 14, wherein the data pages are replicated across a plurality of storage nodes implemented as part of the data store, wherein the storing the pointers to the data pages in the data store as part of the first copy in the data store stores the pointers in a first storage node of the storage nodes, and wherein the method further comprises copying the data pages to a second storage node implemented in the data store that is not included in the plurality of storage nodes that store the data pages.

17. The non-transitory, computer-readable storage medium of claim 16,
  wherein the program instructions further cause the one or more computing devices to further implement evaluating a third storage node included in the plurality of storage nodes to determine that a copy type of the first copy for the data pages stored at the third storage node is a full copy type; and
  wherein, in the copying the data pages to the second storage node, the program instructions cause the one or more computing devices to implement copying the pages from the third storage node to the second storage node to store as a full copy of the data pages.

18. The method of claim 17, wherein evaluating the third storage node comprises evaluating a workload of the third storage node for capacity to store a shared type copy of the database.

19. The non-transitory, computer-readable storage medium of claim 14, wherein the program instructions further cause the one or more computing devices to further implement:
  receiving a request to create a second copy of the first copy of the database; and
  in response to receiving the request to create the second copy, storing the pointers in the first copy in the data store as part of the second copy in the data store, wherein the pointers include the updated pointer to the modified version of the first data page stored as part of the first copy.

20. The non-transitory, computer-readable storage medium of claim 14, wherein the data store is a network-based storage service that stores the data pages for the database across a plurality of storage nodes, wherein requests to access the database are processed by a first database engine head node, and wherein requests to access the first copy of the database are processed by a second database engine head node, including the request to modify the first data page.

* * * * *